United States Patent
Ohnishi et al.

(10) Patent No.: US 11,302,022 B2
(45) Date of Patent: Apr. 12, 2022

(54) THREE-DIMENSIONAL MEASUREMENT SYSTEM AND THREE-DIMENSIONAL MEASUREMENT METHOD

(71) Applicant: OMRON Corporation, Kyoto (JP)

(72) Inventors: Yasuhiro Ohnishi, Kyotanabe (JP); Takashi Shimizu, Hikone (JP); Shinya Matsumoto, Osaka (JP)

(73) Assignee: OMRON Corporation, Kyoto (JP)

( * ) Notice: Subject to any disclaimer, the term of this patent is extended or adjusted under 35 U.S.C. 154(b) by 46 days.

(21) Appl. No.: 16/963,248

(22) PCT Filed: Feb. 14, 2019

(86) PCT No.: PCT/JP2019/005332
§ 371 (c)(1),
(2) Date: Jul. 19, 2020

(87) PCT Pub. No.: WO2019/160032
PCT Pub. Date: Aug. 22, 2019

(65) Prior Publication Data
US 2021/0358157 A1 Nov. 18, 2021

(30) Foreign Application Priority Data
Feb. 14, 2018 (JP) .............................. JP2018-023744

(51) Int. Cl.
*G06T 7/593* (2017.01)
*H04N 13/254* (2018.01)
(Continued)

(52) U.S. Cl.
CPC ............ *G06T 7/593* (2017.01); *G01B 11/245* (2013.01); *G01B 11/25* (2013.01); *H04N 13/239* (2018.05);
(Continued)

(58) Field of Classification Search
CPC .......... G06T 7/593; G06T 2207/10012; G01B 11/245; G01B 11/25; H04N 13/239; H04N 13/254
See application file for complete search history.

(56) References Cited

U.S. PATENT DOCUMENTS

| 6,028,672 A | 2/2000 | Geng |
| 8,224,069 B2 | 7/2012 | Nakajima |

(Continued)

FOREIGN PATENT DOCUMENTS

| CN | 103582802 | 2/2014 |
| CN | 103900494 | 7/2014 |

(Continued)

OTHER PUBLICATIONS

Office Action of China Counterpart Application, with English translation thereof, dated May 21, 2021, pp. 1-25.

(Continued)

*Primary Examiner* — Farzana Hossain
(74) *Attorney, Agent, or Firm* — JCIPRNET

(57) ABSTRACT

A three-dimensional measurement system capable of realizing high-speed processing while increasing measurement resolution are provided. The system includes: an image capture unit including a first and second image capture units that are spaced apart; a first calculation unit calculates a parallax at first feature points in the images using distance information of a three-dimensional measurement method other than a stereo camera method or information for calculating a distance, using at least one of the first and second image capture units; and a second calculation unit calculates a parallax at second feature points based on a corresponding point for the second feature point by using the stereo camera method using the first and second image capture units, and specifies a three-dimensional shape based on the parallax at the first and second feature points. The (Continued)

second calculation unit sets a search area based on the parallax at the first feature points.

12 Claims, 13 Drawing Sheets

(51) Int. Cl.
*H04N 13/239* (2018.01)
*G01B 11/245* (2006.01)
*G01B 11/25* (2006.01)

(52) U.S. Cl.
CPC . *H04N 13/254* (2018.05); *G06T 2207/10012* (2013.01)

(56) References Cited

U.S. PATENT DOCUMENTS

| | | | |
|---|---|---|---|
| 2013/0194390 A1* | 8/2013 | Hirooka | G01C 3/14 348/47 |
| 2013/0250068 A1* | 9/2013 | Aoki | G06T 7/85 348/47 |
| 2013/0308826 A1* | 11/2013 | Asano | H04N 13/271 382/106 |
| 2015/0036917 A1* | 2/2015 | Nanri | G06T 7/593 382/154 |
| 2015/0077520 A1* | 3/2015 | Ohba | G06F 3/017 348/47 |
| 2016/0205378 A1 | 7/2016 | Nevet et al. | |
| 2016/0261848 A1* | 9/2016 | Sekiguchi | B60R 1/00 |
| 2016/0288330 A1* | 10/2016 | Konolige | H04N 13/254 |
| 2017/0054965 A1* | 2/2017 | Raab | G06T 7/70 |
| 2018/0137339 A1* | 5/2018 | Osato | G01C 3/06 |
| 2018/0189550 A1* | 7/2018 | McCombe | G06K 9/00926 |

FOREIGN PATENT DOCUMENTS

| | | |
|---|---|---|
| CN | 104268880 | 1/2015 |
| CN | 106355570 | 1/2017 |
| CN | 107110971 | 8/2017 |
| JP | H0942940 | 2/1997 |
| JP | 2009053059 | 3/2009 |
| JP | 2013065247 | 4/2013 |
| WO | 2016111878 | 7/2016 |

OTHER PUBLICATIONS

"International Search Report (Form PCT/ISA/210) of PCT/JP2019/005332," dated Apr. 2, 2019, with English translation thereof, pp. 1-2.

"Written Opinion of the International Searching Authority (Form PCT/ISA/237) of PCT/JP2019/005332," dated Apr. 2, 2019, with English translation thereof, pp. 1-16.

P. Vuylsteke and A. Oosterlinck, "Range Image Acquisition with a Single Binary-Encoded Light Pattern," IEEE Transactions on Pattern Analysis and Machine Intelligence, vol. 12, Feb. 1990, pp. 148-164.

"Search Report of Europe Counterpart Application", dated Sep. 28, 2021, p. 1-p. 8.

* cited by examiner

Img1 Img3D1

ImgM

Img3DM

| OBJECT | Img1 | Img2 | COMPARATIVE EXAMPLE 1 | COMPARATIVE EXAMPLE 2 | EXAMPLE 1 |
|---|---|---|---|---|---|
| A OBJECT WITH NO TEXTURE | | | ○ | ✕ | ○ |
| B OBJECT WITH SHAPE EDGE | | | ✕ | ○ | ○ |
| C OBJECT WITH TEXTURE | | | ✕ | ○ | ○ |
| D WORKPIECE WITH REGULAR REFLECTION | | | ○ | ✕ | ○ |

FIG. 10

THREE-DIMENSIONAL MEASUREMENT SYSTEM AND THREE-DIMENSIONAL MEASUREMENT METHOD

CROSS-REFERENCE TO RELATED APPLICATION

This application is a 371 application of the International PCT application serial no. PCT/JP2019/005332, filed on Feb. 14, 2019, which claims the priority benefits of Japan Patent Application No. 2018-023744, filed on Feb. 14, 2018. The entirety of each of the above-mentioned patent applications is hereby incorporated by reference herein and made a part of this specification.

FIELD

The present invention relates to a three-dimensional measurement system and a three-dimensional measurement method.

BACKGROUND

A variety of methods for three-dimensionally measuring an object are conventionally known, and these methods are roughly divided, in terms of the characteristics of light, into methods using the straightness of light and those using the velocity of light. Of these methods, the methods using the straightness of light include methods which can be classified as either active measurement or passive measurement, and the methods using the velocity of light include methods that are classified as active measurement. For example, Non-Patent Literature 1 describes, as a specific example of a spatial coding pattern projection method, which is an example of active measurement methods, a so-called active one-shot method in which patterned light that includes a single image with a spatially coded pattern is projected onto an object, an image of the object onto which this single image is projected is captured using an image capture apparatus, and distance calculation is performed, thereby acquiring a three-dimensional shape of the object.

Also, a method using a so-called stereo camera method in which a three-dimensional shape of an object is obtained using two image capturing apparatuses is known as an example of passive measurement methods. In this stereo camera method, image capture apparatuses, such as cameras, are arranged on the left and right sides, for example, an image of an object is simultaneously captured by these apparatuses, the obtained left and right images are searched for a pair of corresponding pixels (i.e. a feature point in a reference image and a corresponding point in a comparative image), parallax (separation distance) between the feature point and the corresponding point in the left and right images is obtained, and three-dimensional positions of respective pixels are calculated based on this parallax, thereby specifying a three-dimensional shape of the object.

CITATION LIST

Non-Patent Literature

Non-Patent Literature 1: P. Vuylsteke and A. Oosterlinck, Range Image Acquisition with a Single Binary-Encoded Light Pattern, IEEE PAMI 12(2), pp. 148-164, 1990 is an example of background art.

SUMMARY

Problems to be Solved

However, in the case of the conventional stereo camera method, the measurement resolution can be increased on the pixel level of the image capture apparatuses, but it is inconvenient if the measurement takes relatively long time due to the principle of the system.

In an aspect, the present invention has been made in view of the foregoing situation, and an object of the present invention is to provide a three-dimensional measurement technique that provides a high measurement resolution in three-dimensional measurement and can realize high-speed processing by narrowing the search area.

Means to Solve Problems

To achieve the above-stated object, the present invention employs the following configuration.

That is to say, in general, an example of a three-dimensional measurement system according to this disclosure acquires parallaxes at first feature points as three-dimensional information regarding an object using a three-dimensional measurement method other than a stereo camera method, acquires a parallax at second feature points as three-dimensional information regarding the object using the stereo camera method in which stereo matching is performed in a limited search area that is set based on the result of acquiring the parallaxes at the first feature points, and specifies the three-dimensional shape of the object using both the obtained parallaxes at the first feature points and parallax at the second feature point. Thus, in an example of the three-dimensional measurement system according to this disclosure, three-dimensional measurement using a three-dimensional measurement method other than the stereo camera method is performed, and thereafter, three-dimensional measurement using the stereo camera method is performed.

In such a configuration, based on the three-dimensional information obtained by using the three-dimensional measurement method different from the stereo camera method, compared to the search area of the conventional stereo camera method, the search area of the three-dimensional measurement performed by the stereo camera method that is performed thereafter is set to be narrower, thus the processing speed can be improved as compared with the conventional method of performing three-dimensional measurement by the stereo camera system alone. Moreover, since the three-dimensional information acquired by the stereo camera method is used, high measurement resolution can be realized.

[1] Specifically, an example of the three-dimensional measurement system according to this disclosure includes: an image capture unit configured to capture different images of an object, the image capture unit including a first image capture unit and a second image capture unit that are spaced apart; a first calculation unit configured to calculate a parallax at first feature points in the images using distance information of a three-dimensional measurement method other than a stereo camera method or information for calculating a distance, using at least one of the first image capture unit and the second image capture unit; and a second calculation unit configured to search for corresponding points for second feature points by means of the stereo camera method using the first image capture unit and the second image capture unit, to calculate a parallax at the second feature points based on a result of the search, and to specify a three-dimensional shape of the object based on the parallax at the first feature points and the parallax at the second feature points. The second calculation unit sets a search area to be searched for the corresponding points for the second feature points, based on the parallax at the first feature points.

With this configuration, the parallaxes at the first feature points are calculated using distance information in the three-dimensional measurement method other than the stereo camera method or information for calculating a distance, using one of the first image capture unit and the second image capture unit, and thus, a parallax map with a relatively low-density distribution that corresponds to the interval between the first feature points is obtained. Thereafter, the corresponding points for the second feature points is searched for by means of a stereo camera method, and a parallax at the second feature points is calculated based on the search result, using the first image capture unit and the second image capture unit. Thus, a parallax map with a relatively high-density distribution on the pixel level of the captured images is obtained. Then, the three-dimensional shape of the object is specified based on both parallax maps.

Here, in the case of image processing solely using the conventional stereo camera method, usually, a corresponding point that is a point corresponding to a feature point need to be searched for by means of stereo matching over a wide area (measurement range) of captured images, inevitably prolonging the processing time. In contrast, with this configuration, the search using the stereo camera method is performed based on the parallaxes at the first feature points that have been obtained using distance information in the three-dimensional measurement method other than the stereo camera method or information for calculating a distance (e.g. phase information, wavelength information, focus blur information etc.). Thus, the search area to be searched for the corresponding point for each second feature point can be limited to a significantly narrower area than that in the case of the conventional stereo camera method. As a result, the search time during stereo matching can be greatly shortened to enable high-speed processing. Meanwhile, the corresponding point that is the point corresponding to the second feature point can be searched for during stereo matching on the pixel level of the captured images, and accordingly, high measurement resolution can be realized.

Note that, in this configuration, the search area for obtaining the parallax at the second feature points may be set based on one of the parallaxes obtained for the first feature points, or may be set based on more than one of the parallaxes obtained for the first feature points. In the case of setting the search area based on more than one parallax, the search area can be limited more accurately than in the case of setting the search area based on one parallax, and, as a result, the processing speed can be further shortened, and/or the stereo matching accuracy can be further increased.

[2] In the above configuration, more specifically, the three-dimensional measurement system may further includes a projection unit configured to project measurement light onto the object to specify the three-dimensional shape.

Here, the "measurement light" is not particularly limited as long as it is projected light or illumination light used in various three-dimensional measurement methods, and may be, for example, patterned light with a predetermined fixed dot pattern, patterned light with a random dot pattern, slit light, or the like. This configuration is useful in the case of projecting predetermined measurement light particularly using an active measurement method as the three-dimensional measurement method other than the stereo camera method.

[3] In the above configuration, the first feature points and the second feature points may be the same points or different points. Particularly, if any of the first feature points and the second feature point are the same point or are present at positions close to each other, the search area to be searched for the second feature point can be limited more accurately, and thus, the processing time can be further shortened, and/or the stereo matching accuracy can be further increased.

Here, in general, examples of the active measurement method using the straightness of light, of the methods for three-dimensionally measuring an object, include a spatial coding pattern projection method, time coding pattern projection method, a moiré topography method (contour method), and an illuminance difference stereo method (irradiation direction/photometric stereo) etc., which use triangulation as a basic principle, as well as an illuminance difference method (single irradiation/inverse square+regression forest), a laser confocal method, a while light confocal method, and an interference method etc., which use coaxial distance measurement as a basic principle. Examples of the passive measurement method using the straightness of light include a stereo camera method (including a multi-baseline stereo), a visual hull method (shape from silhouette), a factorization method, a depth from motion (structure from motion) method, a depth from shading method etc., which uses triangulation as a basic principle, as well as a depth from focusing method, a depth from defocus method, a depth from zoom method etc., which use coaxial distance measurement as a basic principle. Furthermore, examples of the active measurement method using the velocity of light include a light-time difference (TOF) measurement method, a laser scan method, a single-shot method, and an optical phase difference (TOF) measurement method, which use simultaneous distance measurement as a basic principle, as well as (TOF) methods using radio waves, sonic waves, millimeter waves, and so on.

[4] Any of the aforementioned methods excluding the stereo camera method can be applied, without limitation, as the "three-dimensional measurement method other than the stereo camera method" in an example of the three-dimensional measurement system according to this disclosure. Of those methods, a method for obtaining three-dimensional information of the object through one shot by the image capture unit may be used as the three-dimensional method other than the stereo camera method.

This configuration can shorten the time taken to capture the images using the three-dimensional measurement method other than the stereo camera method that is performed before performing the three-dimensional measurement using the stereo camera method, and also can shorten the processing time required by the entire three-dimensional measurement system.

[5] In the above configuration, the second calculation unit may make a threshold for an index of a matching degree in the stereo camera method (stereo matching) lower than that in a case of not setting the search area based on the parallax at the first feature points.

This configuration can realize excellent robustness against interreflection, which could not be able to be achieved with the conventional stereo camera method.

[6] In the above configuration, the first calculation unit may restore a three-dimensional point group indicating three-dimensional positions of the first feature points, and if the three-dimensional point group could not be restored for any of the first feature points, the second calculation unit may set, for the second feature points that correspond to an area of the first feature points for which the three-dimensional point group could be restored, the search area based on the parallax at the first feature points, and, for the second feature points that correspond to an area of the first feature points for which the three-dimensional point group could not be restored, the second calculation unit may set the search area to a predetermined area.

With this configuration, even if the three-dimensional point group cannot be restored for a portion of the object with the first three-dimensional measurement (three-dimensional measurement using the three-dimensional measurement method other than the stereo camera method) that is performed prior to three-dimensional measurement using the stereo camera method, stereo matching need not be performed while widening the search area relative to the entire captured images, and processing speed can be increased.

[7] In the above configuration, the first calculation unit may include a first image processing unit configured to restore a three-dimensional point group indicating the three-dimensional positions of the first feature points, and a second image processing unit configured to two-dimensionally project three-dimensional coordinates of the first feature point in the restored three-dimensional point group onto the images to obtain two-dimensional coordinates of the first feature points, and calculate the parallax at the first feature points based on the two-dimensional coordinates. The second calculation unit may include a third image processing unit configured to calculate the parallax at the second feature points by obtaining estimated values of the parallax at the second feature points based on the parallax at the first feature points, setting a search area to be searched for the corresponding points based on the estimated values of the parallax at the second feature points, and performing stereo matching between the second feature points and the corresponding points in the search area, and a fourth image processing unit configured to specify the three-dimensional shape of the object based on the parallax at the first feature points and the parallax at the second feature points.

This configuration makes it possible to favorably perform the aforementioned calculation of the parallaxes at the first feature points and the parallax at the second feature point, thereby making it possible to more reliably realize high measurement resolution and high-speed processing in the three-dimensional measurement.

[8] In the above configuration, the distance between an optical axis of the first image capture unit and an optical axis of the second image capture unit may be equal to the distance between an optical axis of the projection unit (optical axis of measurement light) and the optical axis of the first image capture unit or the optical axis of the second image capture unit. Here, the "optical axis of the image capture unit" means an optical center axis of the image capture unit, and refers to an optical path of a light beam that vertically enters the center of the imaging plane in which an image is formed by an image sensor (in other words, a direction perpendicular to the imaging plane and passing through the center of the imaging plane), regardless of the configuration of the optical system of the image capture unit. The "optical axis of the projection unit" means an optical center axis of the projection unit, and refers to an optical path of a light beam that vertically exits from the center of the projection plane in which an image is formed by a light source or light emitting elements (in other words, a direction perpendicular to the projection plane and passing through the center or the projection plane, or a direction in which the intensity of the light projected from the projection plane is largest), regardless of the configuration of the optical system of the projection unit.

With this configuration, the base line length between the first image capture unit and the second image capture unit may be equal to the base line length between the projection unit and the first image capture unit or the second image capture unit, and thus, the measurement accuracy in the three-dimensional measurement can be increased.

[9] In the above configuration, the distance between an optical axis of the first image capture unit and an optical axis of the second image capture unit may be longer than the distance between an optical axis of the projection unit (optical axis of measurement light) and the optical axis of the first image capture unit or the optical axis of the second image capture unit.

With this configuration, the base line length between the first image capture unit and the second image capture unit may be larger than the base line length between the projection unit and the first image capture unit or the second image capture unit, and thus, the measurement accuracy in the three-dimensional measurement can be increased.

[10] In the above configuration, an optical axis of the projection unit (optical axis of measurement light), an optical axis of the first image capture unit, and an optical axis of the second image capture unit may be arranged in the same plane.

With this configuration, the arrangement of either [8] or [9] above can be configured. Also, in the case of integrating the projection unit and the first and second image capture units to configure a sensor unit, for example, the base line length between the first image capture unit and the second image capture unit can be made relatively large, making it possible to further increase the measurement accuracy in the stereo camera method.

[11] In the above configuration, an optical axis of the first image capture unit and an optical axis of the second image capture unit may be arranged in the same plane, and an optical axis of the projection unit (optical axis of measurement light) may not be arranged in this plane.

With this configuration as well, the arrangement of either [8] or [9] above can be configured. Also, in the case of integrating the projection unit and the first and second image capture units to configure a sensor unit, for example, it is possible to make the footprint of the sensor unit relatively small and reduce the installation area of the system.

[12] In the above configuration, the projection unit may project an ordinary illumination light that differs from the measurement light, onto the object. In the later-described embodiment, there are cases where a constituent element that projects the measurement light onto the object is called a "first projection unit", and a constituent element that projects an ordinary illumination light onto the object is called a "second projection unit", for convenience.

With this configuration, an ordinary illumination light that differs from the measurement light can be used as normal illumination to be used for checking, for example, and accordingly, the three-dimensional measurement can be favorably performed even if the object is present in a dark surrounding environment. Furthermore, a positional orientation of the object can be more correctly understood by comparing a captured image of the object onto which light of the ordinary illumination is projected with shape design data (CAD model data) regarding the object that is set or held in advance, and performing so-called CAD matching, for example.

[13] An example of a three-dimensional measurement method according to this disclosure is a method that may be effectively performed by using an example of the three-dimensional measurement system with the above-described configuration, and includes the following steps. That is to say, this method includes: a step in which the image capture unit captures images different images of the object; a step in which the first calculation unit calculates a parallax at first feature points in the images using distance information of a three-dimensional measurement method other than a stereo camera method or information for calculating a distance, using at least one of the first image capture unit and the second image capture unit; and a step in which the second calculation unit searches for corresponding points for second feature points by means of the stereo camera method, calculates a parallax at the second feature points based on a result of the search, and specifies a three-dimensional shape of the object based on the parallax at the first feature points and the parallax at the second feature points. In the step of specifying the three-dimensional shape of the object, the second calculation unit sets a search area to be searched for the corresponding points for the second feature points based on the parallax at the first feature points.

In this disclosure, "unit", "means", "apparatus", and "system" do not simply mean physical means, but also include configurations that realize functions that such "unit", "means", "apparatus", and "system" has, by means of software. A function that one "unit", "means", "apparatus", or "system" has may be realized by two or more physical means or apparatuses, or functions that two or more "units", "means", "apparatuses", or "systems" have may be realized by one physical means or apparatus.

Effect

According to the present invention, it is possible to increase measurement resolution in three-dimensional measurement and realize high-speed processing by narrowing a search area.

BRIEF DESCRIPTION OF THE DRAWINGS

FIG. 10 shows a list of images that represent parallax maps that are ultimately obtained as a result of performing three-dimensional measurement on various objects, using various methods.

DETAILED DESCRIPTION

Hereinafter, a mode for carrying out the present invention (also referred to as "embodiment" below) in an example of this disclosure will be described with reference to the drawings. However, the embodiment described below is merely an example, and is not intended to exclude various modifications or applications of the techniques that are not explicitly described below. That is to say, the example of this disclosure can be carried out while being modified in various manners, without departing from the gist thereof. In the following drawings, the same or similar portions are assigned the same or similar signs. The drawings are schematic, and the dimensions, ratios, or the like therein do not necessarily coincide with the actual dimensions, ratios, or the like. Furthermore, there may also be portions where the dimensional relationship or the ratio differs between the drawings.

§ 1 Application Example

Figure 1:
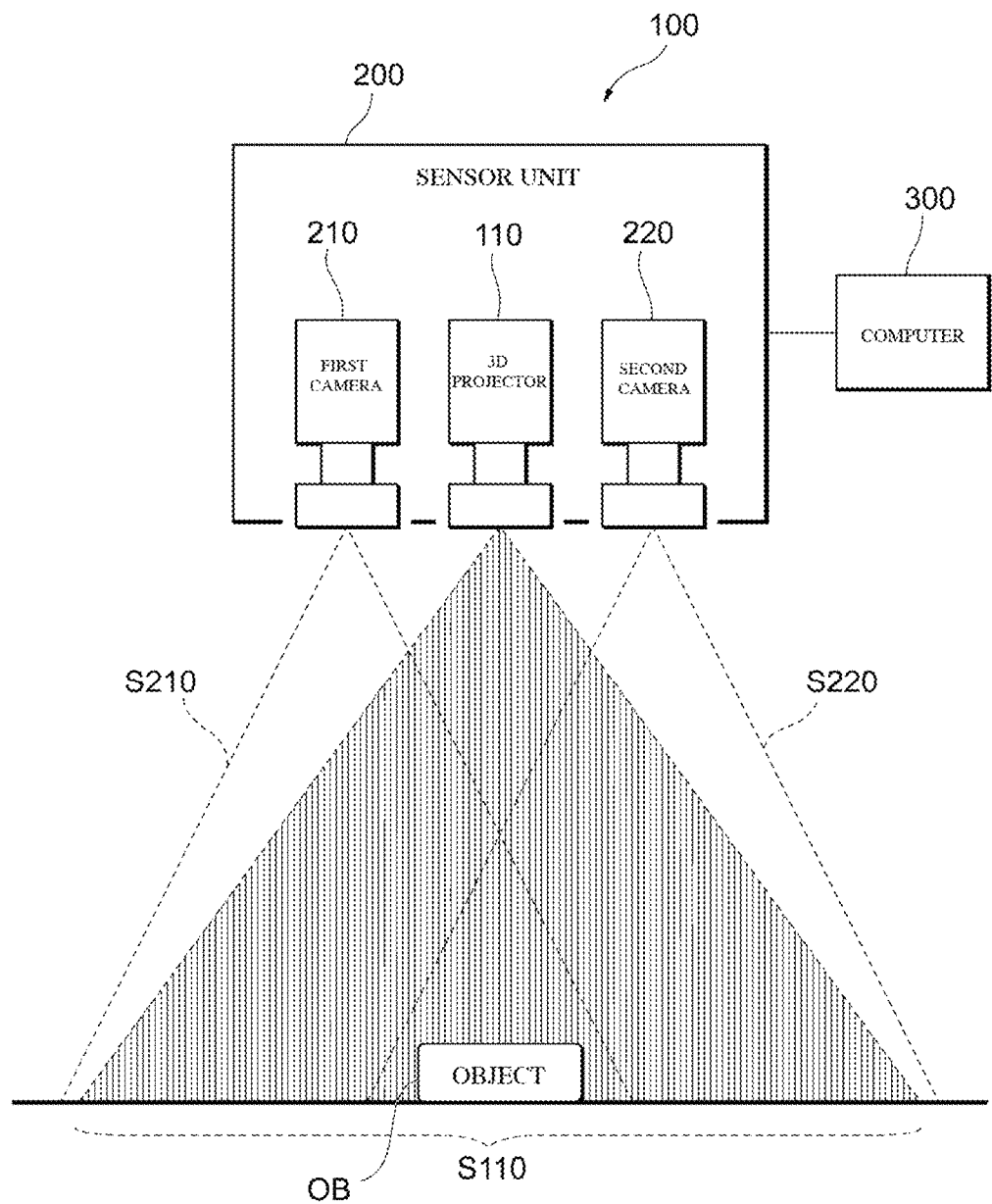
FIG. 1 is a plan view schematically showing an outline of an example of a situation where a three-dimensional measurement system according to an embodiment is applied.

Firstly, a description will be given, with reference to FIG. 1, of the example of a situation where an example of this disclosure is applied. FIG. 1 is a plan view schematically showing an outline of the example of a situation where a three-dimensional measurement system 100 according to this embodiment is applied. The three-dimensional measurement system 100 according to this embodiment is for measuring a three-dimensional shape of an object OB, which is an object to be measured.

In the example in FIG. 1, the three-dimensional measurement system 100 includes a sensor unit 200, which is arranged opposing the object OB, and a computer 300, which is connected to the sensor unit 200. In the sensor unit 200, a 3D projector 110 is integrated with a first camera 210 and a second camera 220, which are arranged with the 3D projector 110 therebetween, for example. Note that the 3D projector 110, the first camera 210, and the second camera 220 do not have to be entirely integrated as the sensor unit 200, and may alternatively be provided separately, or may be partially integrated.

The 3D projector 110 projects light of an illumination including measurement light (e.g. patterned light) for three-dimensionally measuring the object OB (hereinafter, also "3D illumination"), onto the object OB within a projection area S110. The first camera 210 and the second camera 220 each include a camera device equipped with a general optical sensor, for example, and capture an image of the object OB onto which 3D illumination light is projected, at viewing angles S210 and S220, respectively.

The computer 300 controls projection processing performed by the 3D projector 110 and image capture processing performed by the first camera 210 and the second camera 220, and performs image processing on images Img1 and Img2, which differ from each other and are captured by the first camera 210 and the second camera 220, respectively, to specify a three-dimensional shape of the object OB.

More specifically, the computer 300 performs first to fourth image processing, which will be described in (1) to (4) below, as image processing for the images Img1 and Img2.

(1) First Image Processing

The first image processing is three-dimensional measurement using an active one-shot method, for example, in which a three-dimensional point group that indicates three-dimensional positions of a plurality of target pixels corresponding to a pattern included in the measurement light (patterned light) is restored (here, "restored" may encompass the meaning of "derived", "extracted" and "reconstructed") from at least one of the images Img1 and Img2. At this time, for example, the plurality of target pixels are distributed with a lower density than the pixel level of the image Img1 and Img2. In the case of using a passive measurement method as a three-dimensional measurement method other than the stereo camera method, measurement light does not have to be projected, i.e., the 3D projector 110 does not have to be provided.

(2) Second Image Processing

Three-dimensional coordinates of respective points (restored three-dimensional points) in the three-dimensional point group that has been restored for a plurality of first feature points (target pixels) are two-dimensionally projected onto the images Img1 and Img2 (including images obtained by performing appropriate processing on these images as needed; the same also applies to the following description). Two-dimensional coordinates of the respective first feature points in the images Img1 and Img2 are obtained, and a parallax at each of the first feature points is calculated using these two-dimensional coordinates. Thus, a parallax map with a relatively low-density distribution that corresponds to the interval between the plurality of first feature points is obtained.

(3) Third Image Processing

The third image processing is three-dimensional measurement using the stereo camera method, in which stereo matching is performed with one of the images Img1 and Img2 used as a reference image, the other one used as a comparative image. Initially, in the reference image, based on a parallax at first feature points that are present at a predetermined position near a second feature point, and an estimated value of a parallax between the second feature point and a corresponding point is obtained. Then, a search area, which is to be searched for the corresponding points for the second feature points, is set in a limiting manner (i.e. the search area is limited to a narrow area), based on the aforementioned estimated value of the parallax at the second feature point. Stereo matching is performed in this search area, and the parallax at the second feature points is calculated. Thus, a parallax map with a relatively high-density distribution that is equal to the density of the pixels in the images Img1 and Img2 is obtained so that the parallax map with the relatively low-density distribution obtained through (2) above is complemented. Note that the search area for obtaining the parallax at the second feature points may be set based on one of the parallaxes obtained for the respective first feature points, or may be set based on more than one of the parallaxes obtained for the respective first feature points (see also the later description of FIG. 8).

(4) Fourth Image Processing

The parallax maps obtained through (1) to (3) above are integrated to create an integrated parallax map, and appropriate post-processing, such as filtering, is performed on this integrated parallax map as needed. Thereafter, the parallax at each of the pixels (the first feature points in (1) above and the second feature point in (3) above) at which parallax has been obtained are converted to the distance in the depth direction (so-called parallax-depth conversion), thereby specifying a three-dimensional shape of the object OB.

As described above, the sensor unit 200 corresponds to an example of the "projection unit" ("first projection unit") and the "image capture unit" in the present invention. The 3D projector 110 corresponds to an example of the "projection unit" ("first projection unit") in the present invention. The first camera 210 and the second camera 220 correspond to an example of the "first image capture unit" and the "second image capture unit", respectively, in the present invention. The images Img1 and Img2 correspond to an example of the "different images of an object" in the present invention. Furthermore, a portion of the computer 300 that particularly performs image processing (e.g. later-described image processing unit 350) correspond to an example of the "first image processing unit", the "second image processing unit", and the "first calculation unit" that includes the first and second image processing units in the present invention, as well as the "third image processing unit", the "fourth image processing unit", and the "second calculation unit" that includes the third and fourth image processing units.

As described above, this embodiment can be considered as an example of a hybrid three-dimensional measurement system and a method thereof in which three-dimensional measurement using a three-dimensional measurement method (e.g. the active one-shot method in which patterned light serving as measurement light is projected onto an object; but not limited thereto) that enables a three-dimensional shape of an object OB to be obtained and differs from the stereo camera method is integrated with three-dimensional measurement using the stereo camera method that enables a three-dimensional shape of the object OB to be obtained by means of stereo matching. However, even if these conventional methods are simply combined, it is not possible to realize high-speed processing while increasing measurement resolution, which is obvious from the aforementioned technical problems of the respective methods.

In contrast, this embodiment does not simply combine a three-dimensional measurement method other than the stereo camera method with the stereo camera method, but makes it possible to search the search area for the corresponding points for the second feature points (i.e. the points corresponding to the second feature points), in stereo matching to be limited to an area that is greatly narrower than that in the usual stereo camera method, by using three-dimensional information (parallaxes at the first feature points) that are obtained using a three-dimensional measurement method other than the stereo camera method.

In other words, according to this embodiment, firstly, parallax information regarding other pixels (second feature points and corresponding points) that are located between first feature points, whose parallax information has been obtained using a three-dimensional measurement method other than the stereo camera method, can be complemented by the stereo camera method. By limiting the search area for this stereo matching to a probable narrow area, an extremely short processing time can be achieved. As a result, it is possible to significantly shorten the search time and, ultimately, the processing time in the stereo matching, while keeping the high measurement resolution of the stereo camera method. Moreover, by thus limiting the search area, excellent robustness against interreflection can be realized, and incorrect correspondence between pixels in the stereo matching can also be reduced.

§ 2 Configuration Example

Hardware Configuration

Figure 2:
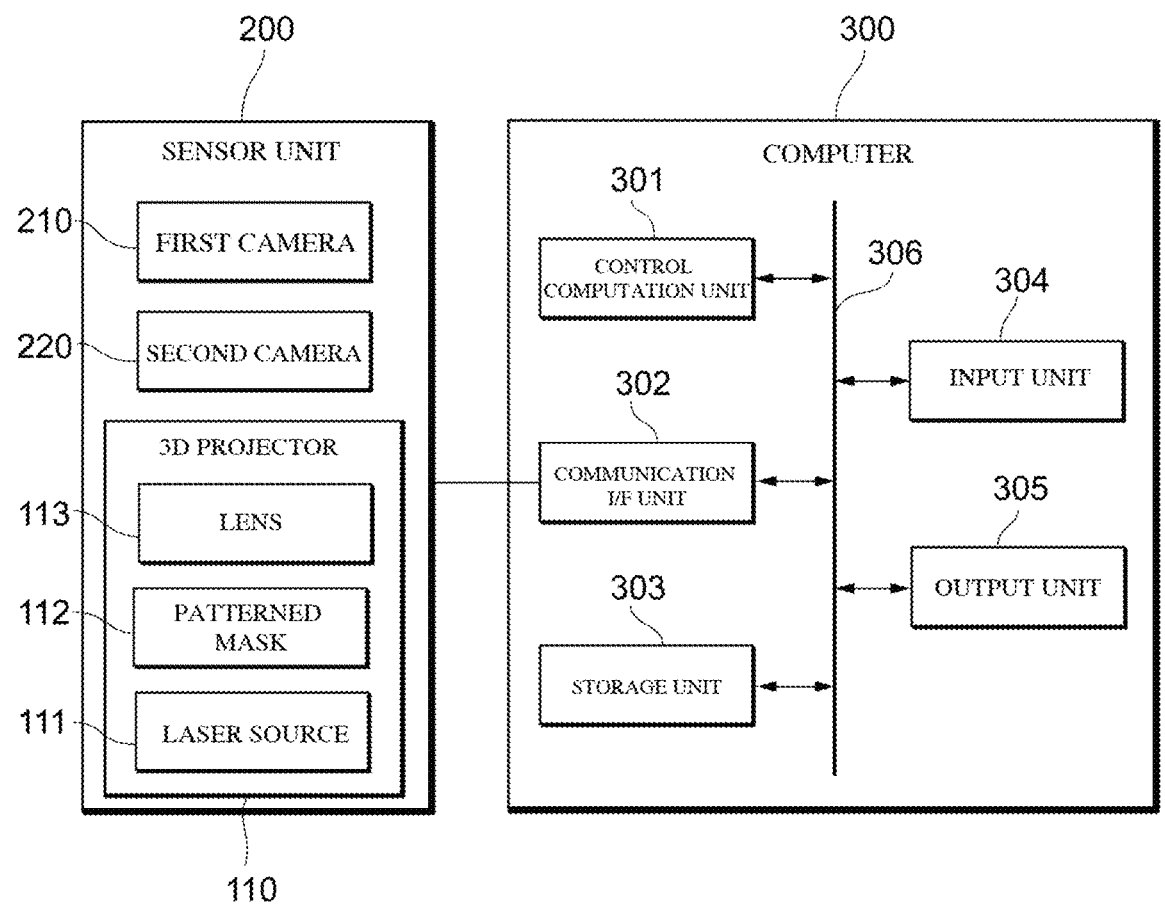
FIG. 2 is a plan view schematically showing an example of a hardware configuration of the three-dimensional measurement system according to an embodiment.

Next, an example of a hardware configuration of the three-dimensional measurement system 100 according to this embodiment will be described with reference to FIG. 2. FIG. 2 is a plan view schematically showing an example of a hardware configuration of the three-dimensional measurement system 100 according to this embodiment.

In the example in FIG. 2, the three-dimensional measurement system 100 includes the sensor unit 200 that has the 3D projector 110, the first camera 210, and the second camera 220, which have also been shown as an example in FIG. 1, and is integrally configured, as well as the computer 300 that is connected to the sensor unit 200.

The 3D projector 110 includes a laser source 111, a patterned mask 112, and a lens 113, for example. Light emitted from the laser source 111 is converted to measurement light (patterned light) that has a predetermined pattern by the patterned mask 112, and is projected to the outside via the lens 113. The wavelength of the laser light generated by the laser source 111 is not particularly limited, and may be infrared light, visible light, ultraviolet light, or the like, for example. A predetermined pattern is formed in the patterned mask 112. Note that the 3D projector 110 is not limited to one with the above-described configuration, and may also be a general projector. In this case, the patterned mask 112 for forming the predetermined pattern may be stored in the projector body, for example. Note that the configuration of the 3D projector 110 is not limited to the above-described one, and for example, a projector apparatus can be applied that is used in various three-dimensional measurement methods and includes an appropriate light source and other optical system parts.

The computer 300 includes a control computation unit 301, a communication interface (I/F) unit 302, a storage unit 303, an input unit 304, and an output unit 305, which can be connected so that they can communicate with each other via a bus line 306.

The control computation unit 301 includes a CPU (Central Processing Unit), a RAM (Random Access Memory), a ROM (Read Only Memory), and so on, and controls the constituent elements and performs various kinds of computation in accordance with information processing.

The communication I/F unit 302 is, for example, a communication module for communicating with other devices in a wired or wireless manner. Any communication method may be used for the communication I/F unit 302 to communicate with other devices, and for example, a LAN (Local Area Network), a USB (Universal Serial Bus), or the like can be used. Particularly, the 3D projector 110, the first camera 210, and the second camera 220 in the sensor unit 200 can be provided so as to be able to communicate with the control computation unit 301, and so on, via the communication I/F unit 302.

The storage unit 303 is an auxiliary storage device such as a hard disk drive (HDD) or a solid-state drive (SSD), and stores various programs that are executed by the control computation unit 301 (programs for controlling hardware such as the sensor unit 200, image processing programs etc.), and data regarding measurement light (e.g. the patterned light with the predetermined pattern), the captured images Img1 and Img2, and so on. In addition, CAD model data regarding the object OB and the like may also be stored in the storage unit 303. Here, the image processing programs include a program for performing the first to fourth image processing described in the above application example, and image processing functions in a later-described functional configuration example are realized as a result of these image processing programs being executed by the control computation unit 301.

The input unit 304 is an interface device for accepting various input operations made by a user, and can be realized with a mouse, a keyboard, a touch panel, or the like, for example. The output unit 305 is an interface device for notifying, for example, the user who uses the three-dimensional measurement system 100 of various kinds of information through display, sound, print, or the like, through a display, speaker, a printer, or the like, for example.

Functional Configuration

Figure 3:
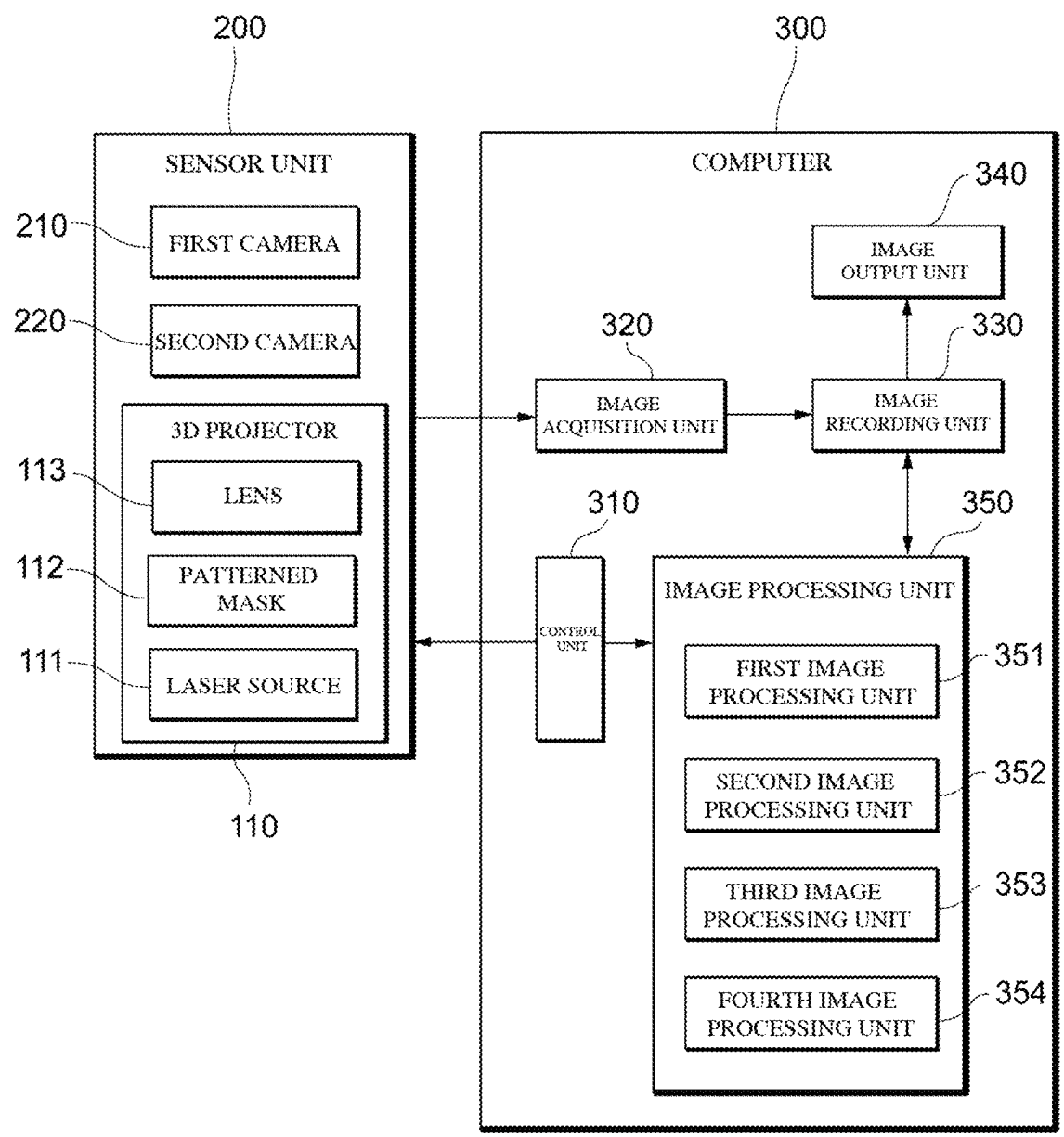
FIG. 3 is a plan view schematically showing an example of a functional configuration of the three-dimensional measurement system according to an embodiment.

Next, an example of a functional configuration of the three-dimensional measurement system 100 according to this embodiment will be described with reference to FIG. 3. FIG. 3 is a plan view schematically showing an example of a functional configuration of the three-dimensional measurement system 100 according to this embodiment.

The control computation unit 301 in the three-dimensional measurement system 100 shown in FIG. 2 loads various programs (control program, image processing program etc.) stored in the storage unit 303 to the RAM. The control computation unit 301 then interprets and executes various programs loaded to the RAM, using the CPU, and controls the constituent elements. Thus, as shown as an example in FIG. 3, the three-dimensional measurement system 100 according to this embodiment can realize a configuration that includes a control unit 310, an image acquisition unit 320, an image recording unit 330, an image output unit 340, and an image processing unit 350.

The control unit 310 particularly controls projection of 3D illumination light onto the object OB from the 3D projector 110 in the sensor unit 200, and capturing of images of the object OB onto which 3D illumination light is projected, using the first camera 210 and the second camera 220. The image acquisition unit 320 acquires, from the first camera 210 and the second camera 220, the images Img1 and Img2 of the object OB that have been captured thereby. The image recording unit 330 holds the images Img1 and Img2 of the object OB acquired by the image acquisition unit 320, a three-dimensional point group image that indicates a three-dimensional shape of the object OB that is ultimately obtained through image processing performed by the image processing unit 350, and so on. The image output unit 340 outputs the thus-obtained three-dimensional point group image that indicates the three-dimensional shape of the object OB, and the like, to the display, printer, or the like so that the user of the three-dimensional measurement system 100 can visually check them.

The image processing unit 350 includes a first image processing unit 351, a second image processing unit 352, a third image processing unit 353, and a fourth image processing unit 354. The first image processing unit 351, the second image processing unit 352, the third image processing unit 353, and the fourth image processing unit 354 respectively perform the first, second, third, and fourth image processing described in (1) to (4) above, and obtain a three-dimensional point group image that indicates a three-dimensional shape of the object OB.

Note that this embodiment has described an example in which the functions realized by the computer 300 included in the three-dimensional measurement system 100 are realized by a general-purpose CPU, but some or all of the aforementioned functions may be realized by one or more dedicated processors. Needless to say, any functions may be omitted, replaced, or added with respect to the functional configuration of the computer 300 included in the three-dimensional measurement system 100 as appropriate, as per the embodiment. The "computer" can be interpreted as a general information processing apparatus.

§ 3 Operation Example

Figure 4:
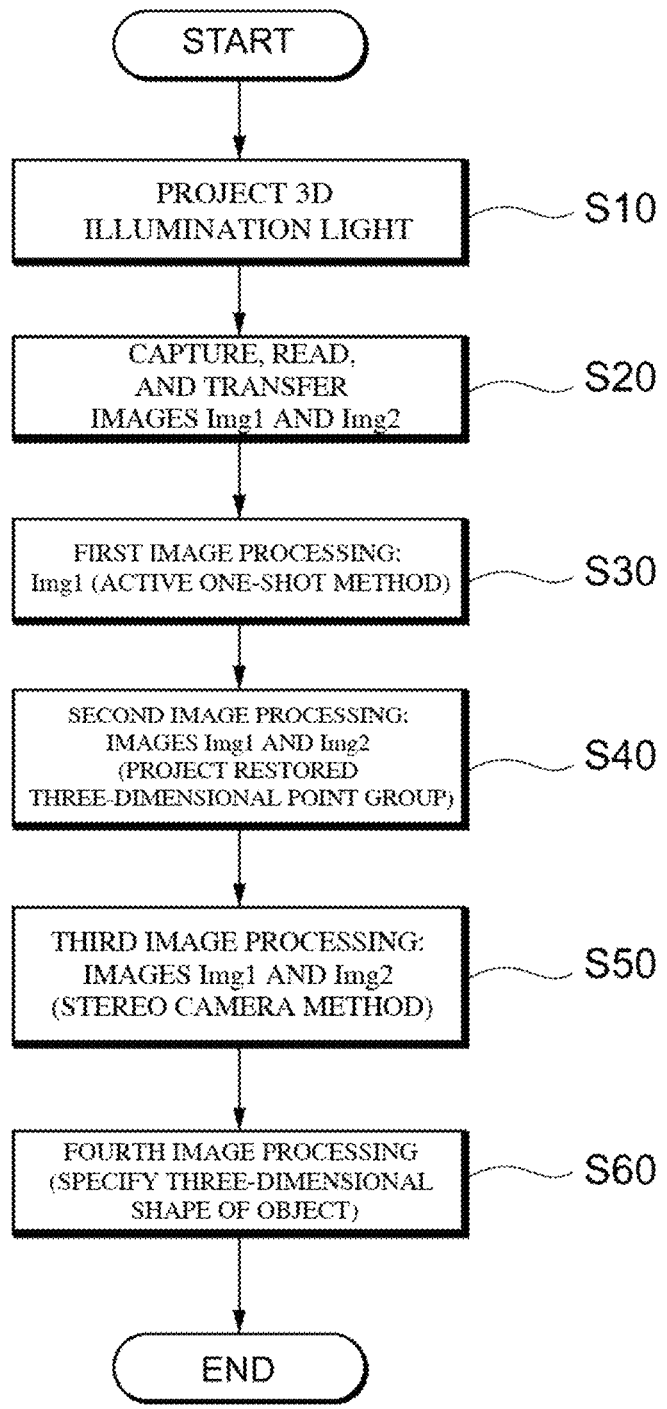
FIG. 4 is a flowchart showing an example of a processing procedure of the three-dimensional measurement system according to an embodiment.
Figure 5:
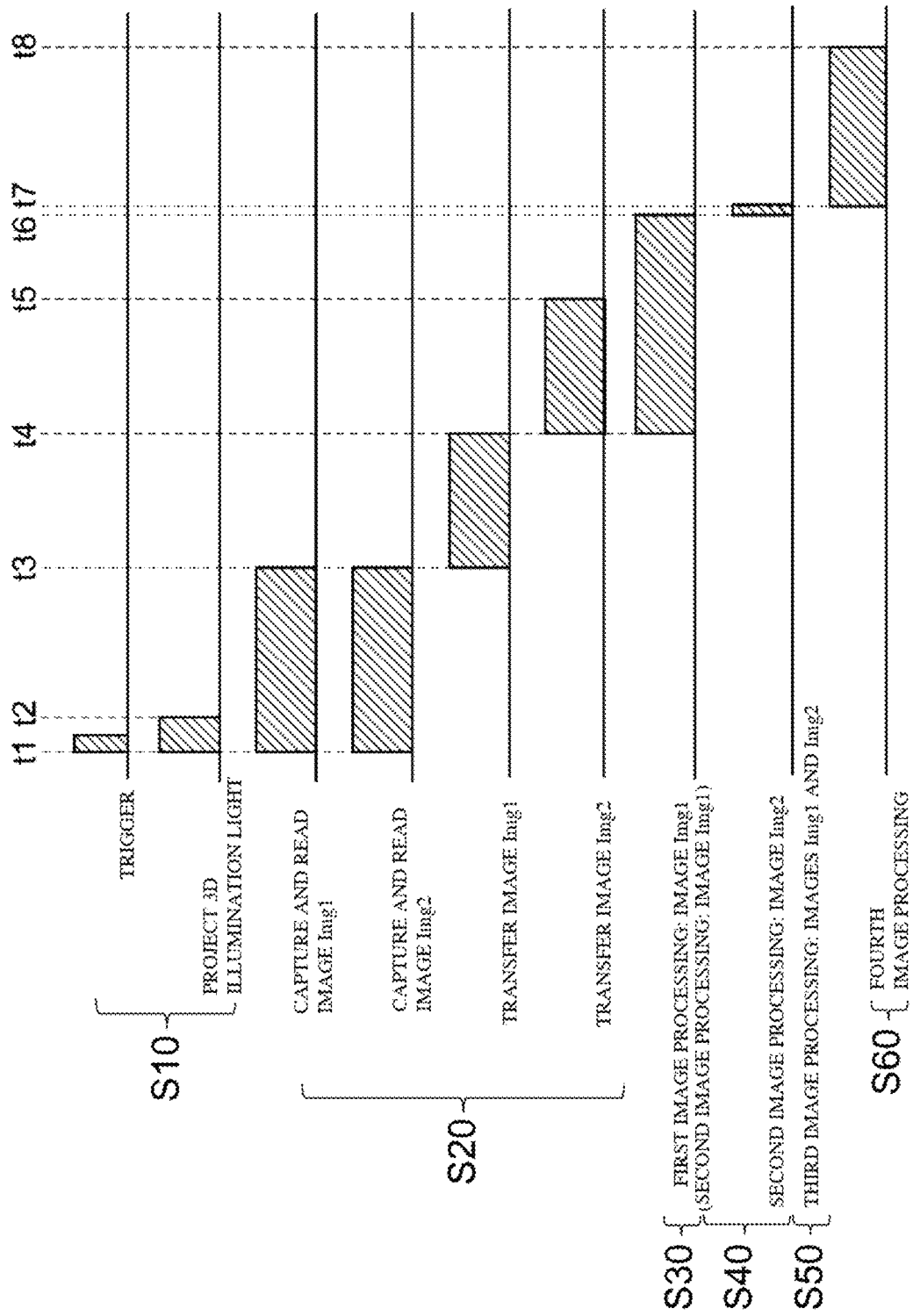
FIG. 5 is a timing chart in an example of the processing procedure of the three-dimensional measurement system according to an embodiment.

Next, an example of operations of the three-dimensional measurement system 100 will be described with reference to FIGS. 4 to 8. FIG. 4 is a flowchart showing an example of a processing procedure in the three-dimensional measurement system 100 according to this embodiment, and is also a flowchart showing an example of a processing procedure for a three-dimensional measurement method that is performed using the three-dimensional measurement system 100. FIG. 5 is a timing chart in an example of the processing procedure in the three-dimensional measurement system 100 according to this embodiment. Note that the processing procedure described below is merely an example, and each of the processes may also be changed to the extent possible. Regarding the processing procedure described below, steps may be omitted, replaced, and added as appropriate, as per the embodiment. Furthermore, "time t" described below indicates a timing of the start or end of processing in FIG. 5. (Start)
Start Initially, the user of the three-dimensional measurement system 100 starts the three-dimensional measurement system 100, and causes the started three-dimensional measurement system 100 to execute various programs (control program, image processing program etc.). Then, the control unit 310 in the computer 300 controls operations of the sensor unit 200 and the computer 300 and performs image processing on the images Img1 and Img2 of the object OB, in accordance with the following processing procedure.
Step S10

First, in step S10, the relative arrangement of the object OB and the sensor unit 200 is adjusted as needed, and sets projection conditions for 3D illumination light from the 3D projector 110 and image capture conditions of the first camera 210 and the second camera 220. Thereafter, based on an appropriate trigger (timing signal) given at time t1, 3D illumination light that includes patterned light is projected onto the object OB from the 3D projector 110 during the period from time t1 to time t2.
Step S20

Next, in step S20, images of the object OB are captured by the first camera 210 and the second camera 220 during the period from time t1 to t2 during which 3D illumination light is projected, and the obtained images Img1 and Img2 are read out from the first camera 210 and the second camera 220 during the period from time t1 to time t3. Subsequently, the images Img1 and Img2 are separately but continuously, or simultaneously transferred to the computer 300 during the period from time t3 to time t5. Note that FIG. 5 illustrates an example of the case of transferring the image Img1 during the period from time t3 to time t4, and transferring the image Img2 during the period from time t4 to time t5.
Step S30

Figure 6A:
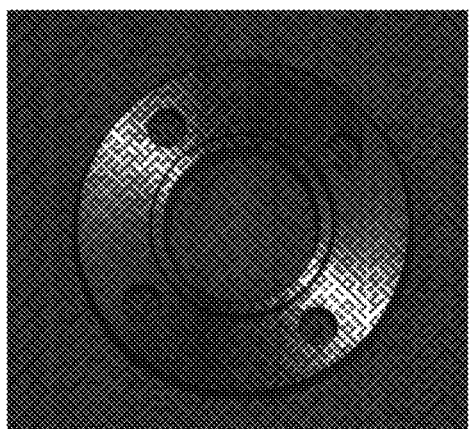
FIG. 6A and FIG. 6B respectively show an image of an example of an object captured by the three-dimensional measurement system according to an embodiment, and a three-dimensional dot group image restored by performing first image processing using the captured image.
Figure 6B:
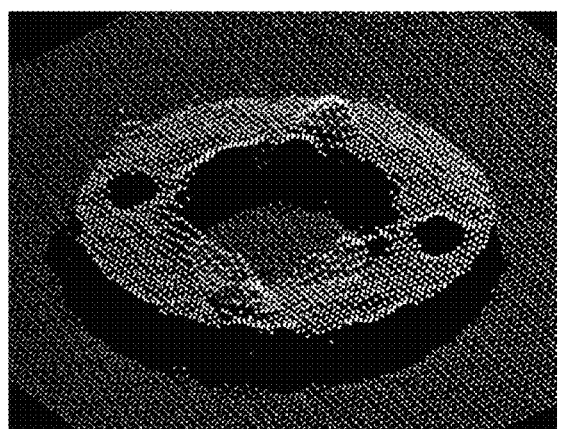

Next, in step S30, the first image processing (e.g. three-dimensional measurement using the active one-shot method) described in (1) above is performed during the period from time t4 to time t6 using at least one of the images Img1 and Img2, and a three-dimensional point group that indicates three-dimensional positions of a plurality of first feature points that correspond to the pattern included in the measurement light (patterned light) is restored from at least one of the images Img1 and Img2. Although FIGS. 4 and 5 illustrate an example of the case of using the image Img1, the image Img2 may alternatively be used, or both the images Img1 and Img2 may also be used. Here, FIGS. 6A and 6B show the image Img1 of an example (metal workpiece) of the object OB that is captured using the three-dimensional measurement system 100, and a three-dimensional point group image Img3D1 that has been restored by performing the first image processing in step S30 on this image Img1.
Step S40

Subsequently, in step S40, the following processing is performed during the period from time t6 to time t7. That is to say, here, ordinary parallelization processing is first performed on the images Img1 and Img2, and the second image processing (projection of a restored three-dimensional point group) described in (2) above is performed using the parallelized images Img1 and Img2 (parallelized images). Thus, three-dimensional coordinates of the first feature points (restored three-dimensional points) in the restored three-dimensional point group (i.e. three-dimensional coordinates of the respective points in FIG. 6B) are two-dimensionally projected onto the images Img1 and Img2. Note that the two-dimensional projection onto the image Img1 can be performed substantially simultaneously with the processing for the image Img1 in step S30 during time t4 to time t6.

Figures 7A, 7B:
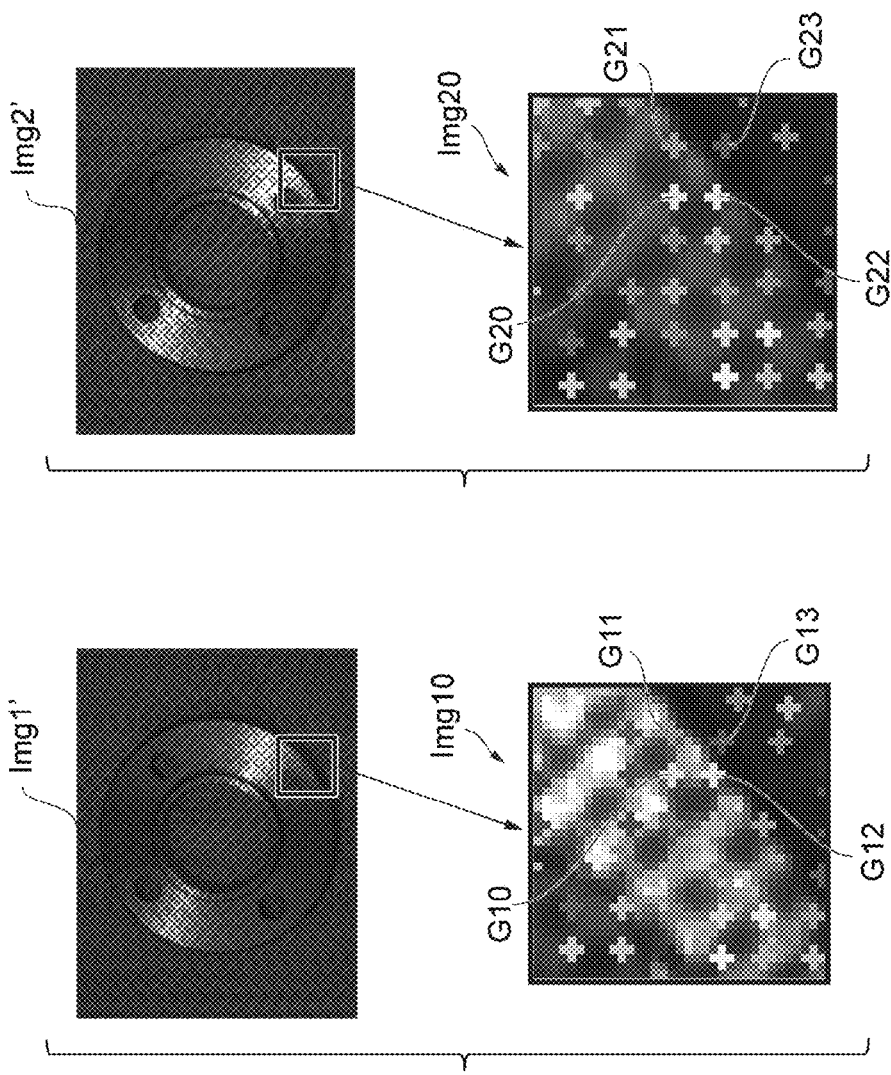
FIG. 7A shows a parallelized image of an image of an example of an object captured by the three-dimensional measurement system according to an embodiment, and a partial enlarged view of an image obtained by two-dimensionally projecting three-dimensional coordinates of restored three-dimensional points onto the parallelized image.
FIG. 7B shows a parallelized image of an image of an example of an object captured by the three-dimensional measurement system according to an embodiment, and a partial enlarged view of an image obtained by two-dimensionally projecting three-dimensional coordinates of restored three-dimensional points onto the parallelized image.

Here, FIG. 7A shows a parallelized image Img1' (which is substantially equal to FIG. 6) of the image Img1 of an example (metal workpiece) of the object OB captured using the three-dimensional measurement system 100, and a partial enlarged view of an image Img10, which is obtained by two-dimensionally projecting the three-dimensional coordinates of the restored three-dimensional points onto the parallelized image Img1'. Similarly, FIG. 7B shows a parallelized image Img2' of the image Img2 of an example (metal workpiece) of the object OB captured using the three-dimensional measurement system 100, and a partial enlarged view of an image Img20 obtained by two-dimensionally projecting the three-dimensional coordinates of restored the three-dimensional points onto the parallelized image Img2'. Each of the symbols "+" in the images Img10 and Img20 corresponds to a two-dimensional projection point of a restored three-dimensional point (target pixel).

Next, a parallax at each of the restored three-dimensional points between the images Img10 and Img20 is calculated as a parallax at each of the plurality of first feature points (target pixels) between the images Img1 and Img2. Here, target pixels G10 to G13, which are shown with the signs as an example in the image Img10 in FIG. 7A, correspond respectively to target pixels G20 to G23, which are shown with the signs as an example in the image Img20 in FIG. 7B, and a parallax at each of the first feature points (target pixels) is calculated based on the two-dimensional coordinates of the corresponding target pixels. Thus, a parallax map is obtained with a relatively low-density distribution that corresponds to the interval between the plurality of first feature points.

Here, a description will further be given below of a more specific example of the aforementioned parallelization processing for the images Img1 and Img2, and numeric processing for two-dimensionally projecting the three-dimensional coordinates of the restored three-dimensional points onto the parallelized images to obtain the two-dimensional coordinates.

First, during the parallelization processing, the origin coordinates of the first camera 210 are set as reference coordinates. Next, assuming that lens distortion of the first camera 210 and the second camera 220 has been eliminated, in advance, from the images Img1 and Img2, and considering a linear model, a three-dimensional point $X_A$ in the active one-shot method, a corresponding two-dimensional coordinate point $U_L$ in the image Img1 obtained by the first camera 210, and a corresponding two-dimensional coordinate point $U_R$ in the image Img2 obtained by the second camera 220 can be modeled to have a relationship expressed by Expressions (1) and (2) below.

[Expression 1]

$$U_L = K_L(I|0)X_A \quad (1)$$

$$U_R = K_R(R_2|t_2)X_A \quad (2)$$

In the above expression, $K_L$ denotes an intrinsic matrix of the first camera 210, $K_R$ denotes an intrinsic matrix, and a rotation matrix $R_2$ and a translation vector $t_2$ express an orientation of the second camera 220 relative to the first camera 210.

Next, if the first camera 210 and the second camera 220 are horizontally installed, both the first camera 210 and the second camera 220 are virtually rotated so that corresponding pixels in the images Img1 and Img2 appear at the same positions in the vertical direction, and thus an ideal parallel state is achieved. During this parallelization processing, the first camera 210 and the second camera 220 are virtually rotated respectively by $R_{rect}·R_2$ and $R_{rect}$, using a rotation matrix $R_{rect}$ and a virtual camera matrix $K_{rect}$ that satisfy the condition expressed by Expression (3) below.

[Expression 2]

$$R_{rect}t_2 = \begin{pmatrix} |t_2| \\ 0 \\ 0 \end{pmatrix} \quad (3)$$

It is then possible to obtain, based on the relationship expressed by Expressions (4) and (5) below, corresponding two-dimensional coordinates $U'_L$ in the parallelized image Img1' that correspond to the restored three-dimensional point $X_A$ obtained by a three-dimensional measurement method (e.g. the active one-shot method) that differs from the stereo camera method, and corresponding two-dimensional coordinates $U'_R$ in the parallelized image Img2'.

[Expression 3]

$$U'_L = K_{rect}R_{rect}R_2(I|0)X_A \quad (4)$$

$$U'_R = K_{rect}R_{rect}(R_2|t_2)X_A \quad (5)$$

Step S50

Next, in step S50, the third image processing (three-dimensional measurement using the stereo camera method) described in (3) above is performed using the images Img1 and Img2 during the period from time t6 to time t7, similarly to step S40. Using one of the images Img1 and Img2 (or the images Img1' and Img2' if the parallelization processing has been performed) as a reference image, and using the other one image as a comparative image, stereo matching is performed between any second feature point in the reference image and the corresponding point in the comparative image. Note that the image Img2 may be the reference image, and the image Img1 may be the comparative image.

Initially, second feature points in the reference image (e.g. image Img1') are extracted, and estimated values of a parallax between the second feature points and the corresponding points are calculated based on a parallax at first feature points that are located at predetermined positions near the extracted second feature points.

Figure 8:
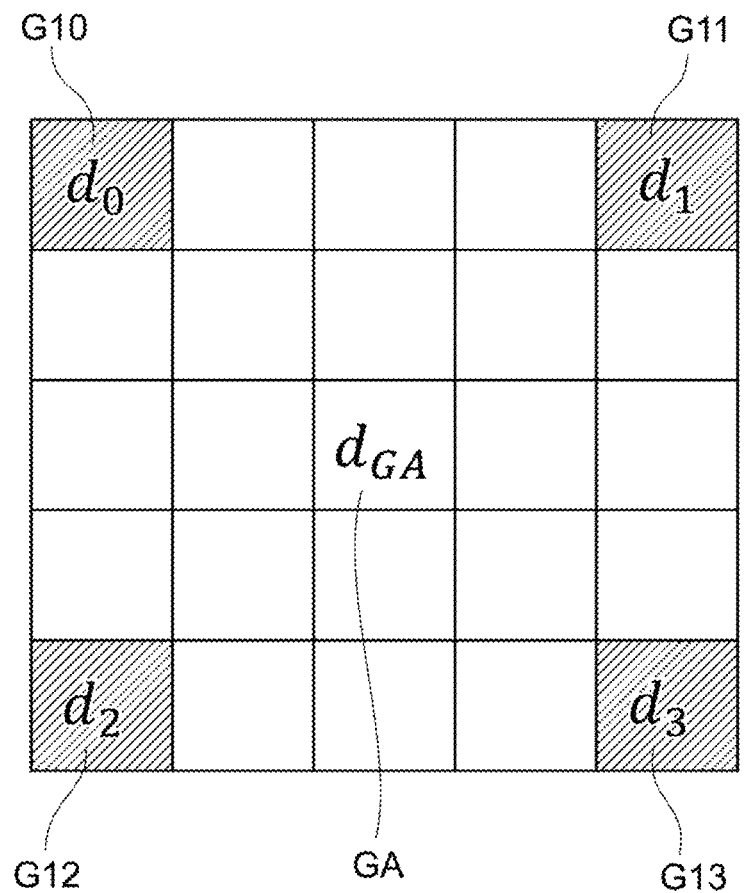
FIG. 8 is a conceptual diagram schematically showing a parallax map with a relatively low-density distribution that corresponds to the interval between a plurality of first feature points.

Here, FIG. 8 is a conceptual diagram schematically showing a parallax map with a relatively low-density distribution that corresponds to the interval between the plurality of first feature points obtained in step S40. FIG. 8 shows each of the areas divided to form a matrix corresponds to a unit pixel in the reference image, and a pixel GA, which is an arbitrarily-extracted second feature point, and, for example, target pixels G10 to G13 (see FIG. 7A), which are the first feature points that are located at positions near the second feature point and parallaxes at which are already known in the parallax map. Here, a description will be given of an example of a method of calculating an estimated value of the parallax between the pixel GA, which is a second feature point, and the corresponding point thereof. However, the estimation method is not limited to the following method. Although a description will be given here of an example of the case where the first feature points and the second feature point are different points and are located at positions near each other, any of the first feature points and the second feature point may alternatively be the same points. Even if the first feature points and the second feature point are different points, they are not limited to those in the example where they are located at position near each other. Furthermore, if the first feature points and the second feature point are different points, and the distance information regarding the first feature points obtained using a three-dimensional measurement method other than the stereo camera method is sufficiently accurate, the calculation speed can be increased by eliminating processing to obtain the distance information regarding the first feature points using the stereo camera method.

That is to say, if the parallax at a pixel that is a first feature point located at a position near the pixel GA that is the second feature point is d, a parallax $d_{GA}$ at the pixel GA that is the second feature point can be estimated as a value within a range that satisfies Expression (6) below, for example. In Expression (6) below, Δd denotes a margin that can be set as appropriate (the same also applies to the following description).

[Expression 4]

$$d-\Delta d \leq d_{GA} \leq d+\Delta d \tag{6}$$

For example, as shown in FIG. 8, if a plurality of target pixels G10 to G13, which are first feature points at which parallaxes have been obtained, are located near positions near the pixel GA, which is a second feature point, it is also possible to evolve the concept of Expression (6) and estimate that the parallax $d_{GA}$ at the pixel GA, which is a second feature point, is a value within a range that satisfies Expression (7) below, for example. In Equation (7) below, $\min(d_n)$ denotes a computation to select the minimum $d_n$, $\max(d_n)$ denotes a computation to select the largest $d_n$, and $d_0$ to $d_3$ respectively denote parallaxes at the pixels G10 to G13, which are the first feature points.

[Expression 5]

$$\min(d_0,d_1,d_2,d_3)-\Delta d \leq d_{GA} \leq \max(d_0,d_1,d_2,d_3)+\Delta d \tag{7}$$

Based on the thus-estimated parallax $d_{GA}$ at the pixel GA that is the second feature point, the search area that is to be searched for the corresponding point for this second feature point, is set in a limiting manner (i.e. the search area is limited to a narrow area). Stereo matching between the parallelized images Img1' and Img2' is performed in this search area, and a true parallax at the pixel GA, which is a second feature point, is calculated. Note that, prior to the stereo matching, appropriate pre-processing such as filtering may also be performed on the parallelized images Img1' and Img2', as needed. Here, although the search area for obtaining the parallax at the second feature points is set based on more than one (namely four) of the parallaxes obtained at the first feature points, this may not necessarily be the case. The search area for obtaining the parallax at the second feature points may alternatively be set based on one, two, three, or five or more of the parallaxes obtained at the first feature points.

By performing the above-described processing on a plurality of second feature points (e.g. all pixels other than the pixels that are the first feature points shown in FIG. 8), a parallax map is obtained with a relatively high-density distribution on the pixel level of the images Img1 and Img2, so as to complement the parallax map (FIG. 8) with a relatively low-density distribution that corresponds to the interval between the plurality of first feature points (e.g. a parallax is calculated at all pixels that are second feature points and do not include the pixels G10 to G13 that are first feature points shown in FIG. 8).

Step S60

Then, in step S60, the parallax information obtained in steps S30 and S50 is integrated during the period from time t7 to time t8. In other words, the parallax map with a relatively low-density distribution obtained in step S30 and the parallax map with a relatively high-density distribution obtained in step S50 are integrated to obtain an integrated parallax map (e.g. a map in which parallax is known at all of the pixels shown in FIG. 8). Next, appropriate post-processing such as filtering is performed on this integrated parallax map as needed, and thereafter, the parallax at each of the pixels that are first feature points and second feature points is converted to a distance in the depth direction (so-called parallax-depth conversion), thereby specifying the three-dimensional shape of the object OB.

Figure 9A:
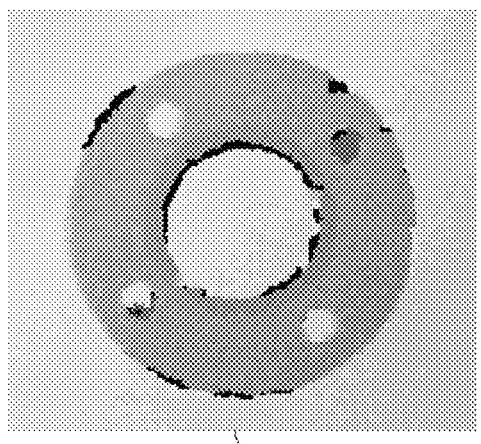
FIG. 9A and FIG. 9B respectively shows an image of an example of an integrated parallax map obtained for an example of an object by the three-dimensional measurement system according to an embodiment, and a three-dimensional point group image that represents a three-dimensional shape restored using the image.
Figure 9B:
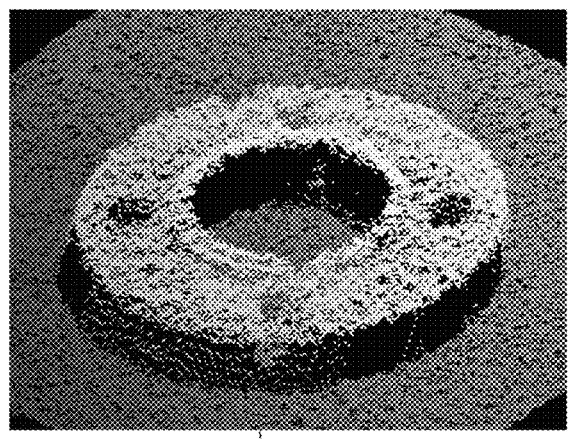

Then, a three-dimensional point group image that indicates the obtained three-dimensional shape of the object OB is output to the display, printer, or the like, as needed, so that the user of the three-dimensional measurement system 100 can visually check the three-dimensional point group image, and the series of processing ends. Here, FIG. 9A shows an image ImgM (in which the magnitude of parallax is schematically shown in a grayscale), which is an example of the integrated parallax map obtained for an example (metal workpiece) of the object OB by the three-dimensional measurement system 100, and FIG. 9B a three-dimensional point group image Img3DM, which expresses a three-dimensional shape that is restored using the image ImgM.

§ 4 Effects

As described above, in an example of the three-dimensional measurement system and the three-dimensional measurement method according to this embodiment, a hybrid three-dimensional measurement system and a method thereof are provided in which three-dimensional measurement using a three-dimensional measurement method other than the stereo camera method is integrated with three-dimensional measurement using the stereo camera method that enables a three-dimensional position of an object to be obtained through stereo matching.

However, in an example of this embodiment, a three-dimensional measurement method other than the stereo camera method is not simply combined with the stereo camera method, but the search area to be searched for corresponding points for second feature points, in stereo matching can be limited to a significantly narrower area than that in the usual stereo camera method, by using three-dimensional information (parallaxes at first feature points) obtained using the three-dimensional measurement method other than the stereo camera method.

In other words, according to an example of this embodiment, focus is placed on pixels between first feature points obtained using the three-dimensional measurement method other than the stereo camera method, parallax information regarding these pixels (second feature point and corresponding points) can be complemented using the stereo camera method. Extremely short processing time can be achieved by limiting the search area in the stereo matching to a probable narrow area. As a result, it is possible to greatly shorten the search time in the stereo matching using the stereo camera method with high measurement resolution on the pixel level (as shown in FIG. 5, the processing time in step S40 is a very short period from time t6 to time t7), and the overall processing time. Moreover, by thus limiting the search area, excellent robustness against interreflection can be realized, and incorrect correspondences between pixels in the stereo matching can also be reduced.

FIG. 10 shows, in the form of a table, a list of images of parallax maps that are ultimately obtained as a result of performing three-dimensional measurement using various methods on objects OB with various different surface characteristics. In all of the methods, the sensor unit 200 in the three-dimensional measurement system 100 according to this embodiment is used as a sensor unit, and FIG. 10 shows two types of obtained images Img1 and Img2 (where the pattern has been erased). The result of only performing image processing using the active one-shot method and the result of only performing image processing using the stereo camera method are referred to as "comparative example 1"

and "comparative example 2", respectively, for convenience. The result of performing image processing using the three-dimensional measurement system 100 according to this embodiment is referred to as "example 1". The selected objects OB are: A. an object with no texture; B. an object with an edge of its shape; C. an object with texture; and D. a workpiece on which regular reflection occurs. Furthermore, in FIG. 10, an image that indicates a good result is marked with an "o", and an image that does not indicate a good result is marked with an "x", in the entries of images of the parallax maps obtained for the objects OB using the respective methods.

As shown in FIG. 10, in the comparative example 1 (image processing using the active one-shot method only), favorable results were obtained for A. the object with no texture and D. the workpiece on which regular reflection occurs, but favorable results were not obtained for B. the object with an edge of its shape and C. the object with texture. On the contrary, in the comparative example 2 (image processing using the stereo camera method only), favorable results were obtained for B. the object with an edge of its shape and C. the object with texture, but favorable results were not obtained for A. the object with no texture and D. the workpiece on which regular reflection occurs. In contrast, favorable results were obtained for all of the objects OB in the example 1 (with image processing using the three-dimensional measurement system 100 according to this embodiment). These results can be considered to indicate an example of superiority (particularly, high robustness against differences in surface characteristics of the objects OB) of the three-dimensional measurement system 100 according to this embodiment to the other methods. As illustrated, it has been confirmed that, in an example of this embodiment, results superior to those obtained with the conventional methods can be achieved by effectively combining differences in measurable areas based on the differences in the respective measurement principles of a three-dimensional measurement method (e.g. the active one-shot method) other than the stereo camera method and of the stereo camera method.

§ 5 Modifications

Although the embodiment serving as an example of this disclosure has been described in detail, the above description is merely an example of this disclosure in all aspects. Needless to say, various improvements and modifications may be made without departing from the scope of the present invention. For example, the following modifications are possible. Note that, in the following description, the same constituent elements as those described in the above embodiment are assigned the same signs, and descriptions of the same points as those described in the above embodiment are omitted as appropriate. The following modifications may be combined as appropriate.

5.1

For example, regarding (1) first image processing in step S30 in the operation example in the above embodiment, the case of only using the image Img1, of the images Img1 and Img2, is used has been mentioned. However, (1) the first image processing may alternatively be performed only using the image Img2, of the images Img1 and Img2, or may also be performed using both the images Img1 and Img2.

Particularly, with the configuration using both the images Img1 and Img2, two parallax maps with a relatively low-density distribution are obtained, and thus, the accuracy and/or probability in the estimation of an unknown parallax at a feature point can be increased. Also, a configuration in which a relatively better one of the two images is selectively used also increases the accuracy of the parallax map itself with a relatively low-density distribution. Accordingly, in this case as well, the accuracy and/or probability in the estimation of an unknown parallax at a feature point can be increased.

Note that the cameras provided in the sensor unit 200 are not limited to one first camera 210 and one second camera 220 (two cameras in total), and the number of at least either first camera 210 or second camera 220 may be more than one (three or more cameras in total). The number of images Img1 and the number of images Img2 captured by the respective cameras are not limited to one, and of course, a plurality of images Img1 and a plurality of images Img2 may be captured. With these configurations, images to be used to obtain a parallax map with a relatively low-density distribution can be chosen from a wider range of images. Accordingly, in this case as well, the accuracy and/or probability in the estimation of an unknown parallax at a feature point can be further increased, and the selectivity for the two images used in the stereo camera method can also be increased. As a result, the accuracy and/or probability of the ultimately-specified three-dimensional shape can be further increased.

5.2

Here, a description will be given, with reference to FIGS. 11A to 11D, of configuration examples associated with a relative geometrical arrangement of the 3D projector 110, the first camera 210, and the second camera 220 in the sensor unit 200.

5.2.1

Figure 11A:
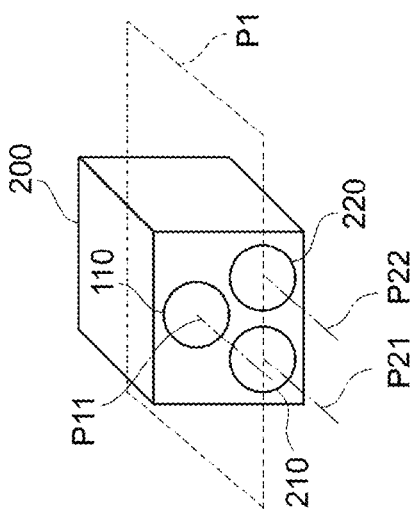
FIG. 11A, FIG. 11B, FIG. 11C and FIG. 11D are perspective views schematically showing first to fourth configuration examples, respectively, of a sensor unit according to an embodiment.

FIG. 11A is a perspective view schematically showing a first configuration example of the sensor unit 200. In the first configuration example, an optical axis P21 of the first camera 210 and an optical axis P22 of the second camera 220 are arranged in the same plane P1, and an optical axis P11 of the 3D projector 110 is not arranged in this plane P1. In other words, in the first configuration example, the optical axis P11 of the 3D projector 110 is arranged at a position different from a position on the imaginary plane P1 that is demarcated by the optical axis P21 of the first camera 210 and the optical axis P22 of the second camera 220. Also, in the first configuration example, the distance between the optical axis P21 of the first camera 210 and the optical axis P22 of the second camera 220 is equal to both the distance between the optical axis P11 of the 3D projector 110 and the optical axis P21 of the first camera 210 and the distance between the optical axis P11 of the 3D projector 110 and the optical axis P22 of the second camera 220.

In the first configuration example, the base line length (distance) between the first camera 210 and the second camera 220 is equal to both the base line length between the 3D projector 110 and the first camera 210 and the base line length between the 3D projector 110 and the second camera 220. Accordingly, the measurement accuracy in three-dimensional measurement can be increased. In this case, the measurement accuracy in the active one-shot method using the first camera 210 can be made equal to the measurement accuracy in the active one-shot method using the second camera 220, which is useful in performing three-dimensional measurement in the active one-shot method using both cameras. Furthermore, the footprint of the sensor unit 200 can be made relatively small, and thus, the installation area of the three-dimensional measurement system can be reduced.

5.2.2

Figure 11B:
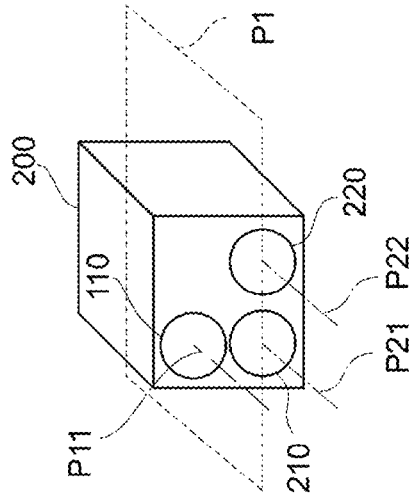

FIG. 11B is a perspective view schematically showing a second configuration example of the sensor unit 200. In the second configuration example as well, the optical axis P21 of the first camera 210 and the optical axis P22 of the second camera 220 are arranged in the same plane P1, and the optical axis P11 of the 3D projector 110 is not arranged in this plane P1. In other words, in the second configuration example as well, the optical axis P11 of the 3D projector 110 is arranged at a position different from a position on the imaginary plane P11 that is demarcated by the optical axis P21 of the first camera 210 and the optical axis P21 of the second camera 220. Also, in the second configuration example, the distance between the optical axis P21 of the first camera 210 and the optical axis P22 of the second camera 220 is made longer than the distance between the optical axis P11 of the 3D projector 110 and the optical axis P21 of the first camera 210.

In the second configuration example, the base line length between the first camera 210 and the second camera 220 is larger than the base line length between the 3D projector 110 and the first camera 210, and thus, the measurement accuracy in three-dimensional measurement can be increased. Also, in this case, the measurement accuracy in the active one-shot method using the second camera 220 can be increased compared with the measurement accuracy in the active one-shot method in the first configuration example (FIG. 11A), which is useful in performing three-dimensional measurement using the active one-shot method with one of the cameras. Furthermore, the footprint of the sensor unit 200 can be made relatively small, and thus, the installation area of the three-dimensional measurement system can be reduced.

5.2.3

Figure 11C:
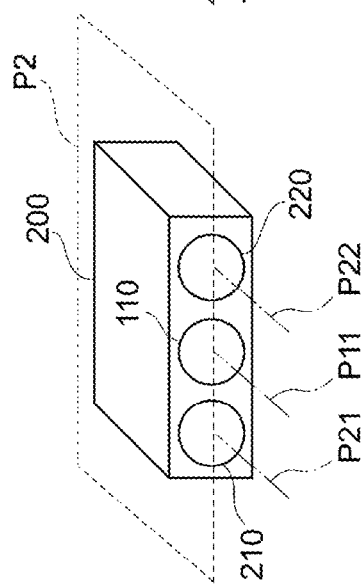

FIG. 11C is a perspective view schematically showing a third configuration example of the sensor unit 200. In the third configuration example, the optical axis P11 of the 3D projector 110 is arranged in an imaginary plane P2 that is demarcated by the optical axis P21 of the first camera 210 and the optical axis P22 of the second camera 220 (e.g. all of these optical axes are arranged in the same plane). Also, in the third configuration example, the first camera 210 and the second camera 220 are configured such that the distance between the optical axis P11 of the 3D projector 110 and the optical axis P21 of the first camera 210 is equal to the distance between the optical axis P11 of the 3D projector 110 and the optical axis P22 of the second camera 220.

In the third configuration example, the base line length between the first camera 210 and the second camera 220 is longer than the base line length between the 3D projector 110 and the first camera 210, and is also longer than the base line length between the 3D projector 110 and the second camera 220, and thus, the measurement accuracy in three-dimensional measurement can be increased. Also, since the base line length between the 3D projector 110 and the first camera 210 is equal to the base line length between the 3D projector 110 and the second camera 220, the measurement accuracy in the active one-shot method using the first camera 210 can be made equal to the measurement accuracy in the active one-shot method using the second camera 220, which is useful in performing three-dimensional measurement in the active one-shot method using both cameras. Furthermore, the base line length between the first camera 210 and the second camera 220 can be made larger than, for example, those in the first configuration example (FIG. 11A) and the second configuration example (FIG. 11B). Accordingly, if conditions regarding other measurement parameters and algorithms are the same, the measurement accuracy in the stereo camera method can be further increased, which is useful in the case of increasing the measurement accuracy in the stereo camera method even by increasing the installation area of the sensor unit 200.

5.2.4

Figure 11D:
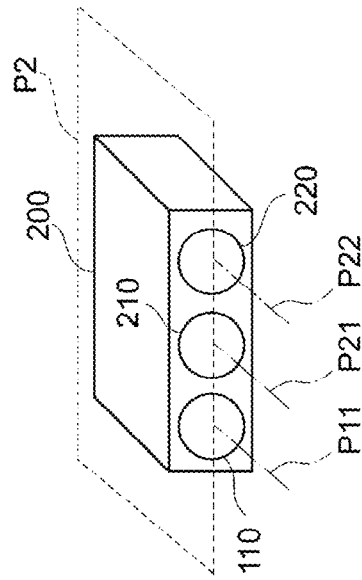

FIG. 11D is a perspective view schematically showing a fourth configuration example of the sensor unit 200. In the fourth configuration example as well, the optical axis P11 of the 3D projector 110 is arranged in the imaginary plane P2 that is demarcated by the optical axis P21 of the first camera 210 and the optical axis P22 of the second camera 220 (i.e. all of these optical axes are arranged in the same plane P2). Also, in the fourth configuration example, the distance between the optical axis P21 of the first camera 210 and the optical axis P22 of the second camera 220 is made equal to the distance between the optical axis P11 of the 3D projector 110 and the optical axis P21 of the first camera 210.

In the fourth configuration example, the base line length between the first camera 210 and the second camera 220 is equal to the base line length between the 3D projector 110 and the first camera 210, and accordingly, the measurement accuracy in three-dimensional measurement can be increased. Also, in this case, the measurement accuracy in the active one-shot method using the second camera 220 can be increased compared with the measurement accuracy in the active one-shot method in the third configuration example (FIG. 11C), which is useful in the case of performing three-dimensional measurement using the active one-shot method with one of the cameras, and further increasing the measurement accuracy in the active one-shot method.

5.3

Next, a description will be given, with reference to FIGS. 12A and 12B, of a configuration example in which a 2D projector 120 for projecting usual illumination light to an object OB is additionally arranged in the sensor unit 200. Thus, the 2D projector 120 corresponds to an example of the "projection unit" ("second projection unit") according to the present invention, the 3D projector 110 and the 2D projector 120 each correspond to an example of the "projection unit" according to the present invention, and the sensor unit 200 that includes the 2D projector 120 also correspond to an example of the "projection unit" according to the present invention.

5.3.1

Figure 12A:
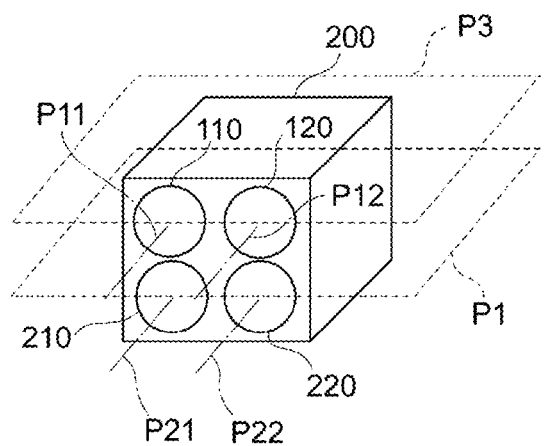
FIG. 12A and FIG. 12B are perspective views schematically showing fifth and sixth configuration examples, respectively, of the sensor unit according to an embodiment.

FIG. 12A is a perspective view schematically showing a fifth configuration example of the sensor unit 200. The fifth configuration example has an arrangement in which 2D projector 120 is additionally provided to the second configuration example shown in FIG. 11B. In the fifth configuration example, the optical axis P21 of the first camera 21 and the optical axis P22 of the second camera 220 are arranged in the same plane P1, and the optical axis P11 of the third projector 110 and an optical axis P12 of the 2D projector 120 are arranged in the same plane P3, which differs from the plane P1. Note that the plane P1 and the plane P3 are parallel to each other.

In the fifth configuration example, the 2D projector 120 can be used as an ordinary illumination to be used in check, for example, and thus, the three-dimensional shape can be favorable measured even if an object OB is in a dark surrounding environment. Also, by acquiring an image of an object OB onto which the ordinary illumination light is projected from the 2D projector 120, comparing this image with shape design data (CAD model data) regarding the object OB, which is set or held, in advance, in the storage unit 303 or the image recording unit 330 in the computer 300, for example, and performing so-called CAD matching, the positional orientation of the object OB can be understood more correctly.

In the fifth configuration example, the configuration of the sensor unit 200, excluding the 2D projector 120, is the same as the second configuration example. Accordingly, the measurement accuracy in three-dimensional measurement can be increased, similarly to the second configuration example. Also, in this case, the measurement accuracy in the active one-shot method using the second camera 220 can be increased compared with the measurement accuracy in the active one-shot method in the first configuration example (FIG. 11A), which is useful in performing three-dimensional measurement using the active one-shot method with one of the cameras. Furthermore, the footprint of the sensor unit 200 can be made relatively small, and thus, the installation area of the three-dimensional measurement system can be reduced.

5.3.2

Figure 12B:
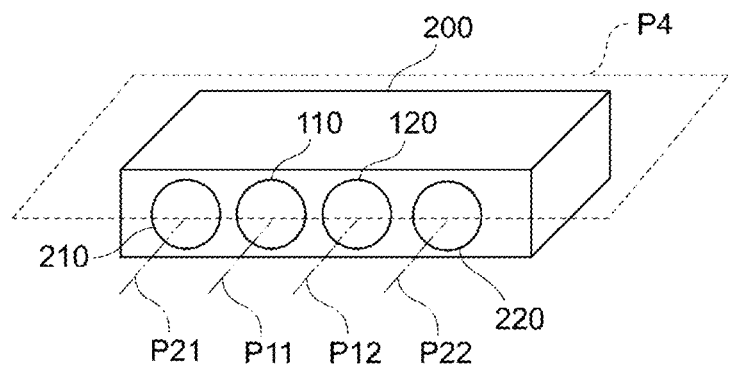

FIG. 12B is a perspective view schematically showing a sixth configuration example of the sensor unit 200. The sixth configuration example has an arrangement in which the 2D projector 120 is additionally provided to the third configuration example shown in FIG. 11C. In the sixth configuration example, the optical axis P12 of the 2D projector 120 is arranged at a position on an imaginary plane P4, which is demarcated by the optical axis P11 of the 3D projector 110, the optical axis P21, and the optical axis P22 of the second camera 220 (i.e. all of these optical axes are arranged in the same plane P4), and the 2D projector 120 is arranged between the 3D projector 110 and the second camera 220.

In the sixth configuration example, the 2D projector 120 can be used as an ordinary illumination to be used in check, for example, similarly to the fifth configuration example, and thus, a three-dimensional shape can be favorable measured even if an object OB is in a dark surrounding environment. Also, by acquiring a captured image of an object onto which an ordinary illumination light is projected from the 2D projector 120, comparing this image with shape design data (CAD model data) regarding the object OB, which is set or held, in advance, in the storage unit 303 or the image recording unit 330 in the computer 300, for example, and performing so-called CAD matching, the positional orientation of the object OB can be understood more correctly.

In the sixth configuration example, the base line length between the first camera 210 and the second camera 220 is larger than both the base line length between the 3D projector 110 and the first camera 210 and the base line length between the 3D projector 110 and the second camera 220, and accordingly, the measurement accuracy in three-dimensional measurement can be increased. Also, in this case, the measurement accuracy in the active one-shot method using the second camera 220 can be increased compared with the measurement accuracy in the active one-shot method in the third configuration example (FIG. 11C), which is useful in the case of performing three-dimensional measurement in the active one-shot method using one of the cameras, and further increasing the measurement accuracy in the active one-shot method. Furthermore, the base line length between the first camera 210 and the second camera 220 can be further increased compared with the third configuration example (FIG. 11C), for example. Accordingly, if conditions regarding other measurement parameters and algorithms are the same, the measurement accuracy in the stereo camera method can be further increased, which is useful in the case of further increasing the measurement accuracy in the stereo camera method even by further increasing the installation area of the sensor unit 200.

5.4

Note that the arrangements in the sensor unit 200 in the above first to sixth configuration examples have been described as examples of configurations useful in performing stereo matching using the stereo camera method, based on measurement information obtained using measurement methods with triangulation serving as a basic principle, as a three-dimensional measurement method other than the stereo camera method.

Meanwhile, it is possible to conceive, as a mode using another three-dimensional measurement method, a seventh configuration example in which stereo matching using the stereo camera method is performed based on measurement information obtained using a measurement method (such as any of various TOF measurement methods) with coaxial distance measurement serving as the basic principle, as a three-dimensional measurement method other than the stereo camera method. In the case of the seventh configuration example, the sensor units 200 shown in FIGS. 11A to 11D and FIGS. 12A and 12B can be used. Of these sensor units 20, the measurement accuracy can be further increased with the sensor units with the arrangements shown FIGS. 11C and 12B in which the base line length between the 3D projector 110 (illumination light for time measurement) and the first camera 210 is especially shorter (i.e. the distance therebetween is especially shorter), and the base line length between the first camera 210 and the second camera 220 is especially longer (i.e. the distance therebetween is especially longer). In particular, the arrangement shown in FIG. 12B is useful.

5.5

The above embodiment has described a configuration in which, for example, one of the first camera 210 and the second camera 220 is used, and parallaxes at first feature points are obtained after measuring distance through measurement using the active one-shot method. Meanwhile, it is also possible to conceive, as a mode using yet another three-dimensional measurement method, an eighth configuration example in which parallaxes at first feature points are obtained by specifying spatial codes using both the first camera 210 and the second camera 220 with patterned light projected onto an object OB. Specifically, the measurement in the eighth configuration example can be performed using a spatial coding pattern projection method and/or a time coding pattern projection method.

5.6

Furthermore, a description will be given, with reference to FIGS. 13A to 13C, of configuration examples associated with the projection area S110 for 3D illumination light that is projected from the 3D projector 110 in the sensor unit 200.

5.6.1

Figure 13A:
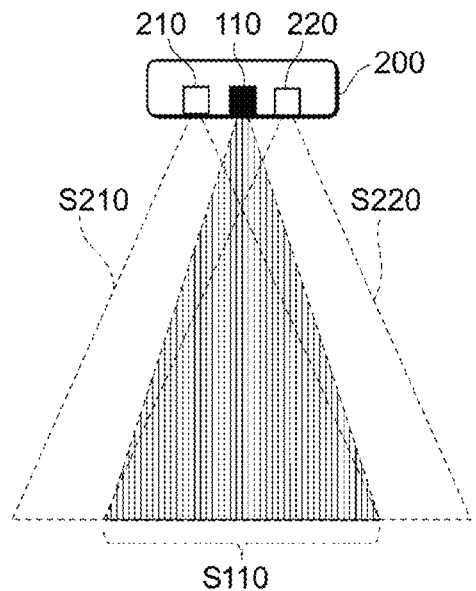
FIG. 13A, FIG. 13B and FIG. 13C are plan views schematically showing ninth to eleventh configuration examples, respectively, of the sensor unit according to an embodiment.

FIG. 13A is a plan view schematically showing a ninth configuration example of the sensor unit 200. The ninth configuration example has a 3D projector 110 in which the projection area S110 for 3D illumination light covers a portion (common field of view) where a viewing angle S210 of the first camera 210 overlaps a viewing angle S220 of the second camera 220. The ninth configuration example is particularly favorable in the case of capturing the images Img1 and Img2 with one projection of 3D illumination light and performing hybrid three-dimensional measurement using these images Img1 and Img2 in the three-dimensional measurement system 100 in the above embodiment.

5.6.2

Figure 13B:
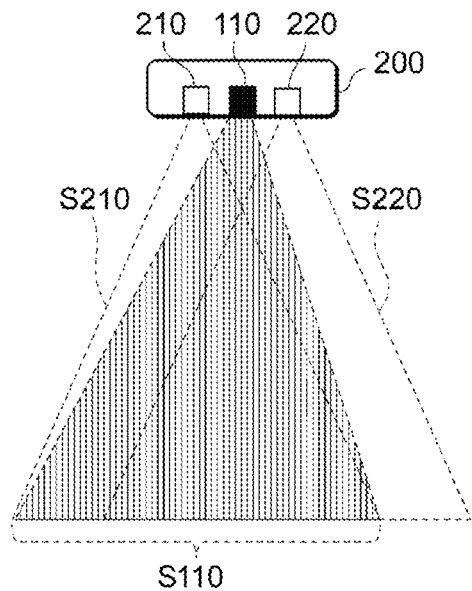

FIG. 13B is a plan view schematically showing a tenth configuration example of the sensor unit 200 The tenth configuration example has a 3D projector 110 in which the projection area S110 for 3D illumination light covers the entirety of either one (single field of view) of the viewing angle S210 of the first camera 210 and the viewing angle S220 of the second camera 220. The tenth configuration example is useful when capturing the image to be used in the active one-shot method in the three-dimensional measurement system 100 according to the above embodiment. In this case, the images to be used in the stereo camera method can be captured with another illumination (e.g. 2D projector) with a different projection area.

5.6.3

Figure 13C:
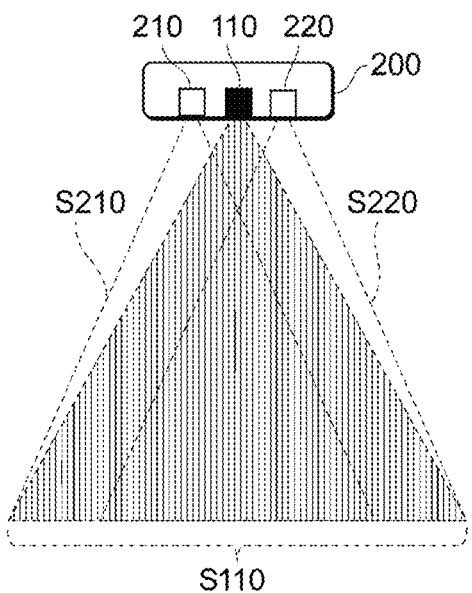

FIG. 13C is a plan view schematically showing an eleventh configuration example of the sensor unit 200. The eleventh configuration example has a 3D projector 110 in which the projection area S110 for 3D illumination light covers the entirety (a plurality of fields of view) of both the viewing angle S210 of the first camera 210 and the viewing angle S220 of the second camera 220. The eleventh configuration example can be favorably applied to both the case of capturing the images Img1 and Img2 with one projection of 3D illumination light and performing hybrid three-dimensional measurement using these images Img1 and Img2 in the three-dimensional measurement system 100 according to the above embodiment, and the case of separately capturing the image to be used in the active one-shot method and the images to be used in the stereo camera method.

5.7

In this embodiment, in step S30, a three-dimensional point group that indicates three-dimensional positions of a plurality of first feature points corresponding to the patter included in the measurement light (patterned light) is restored using at least one of the images Img1 and Img2. However, depending on the shape of the object OB or measurement conditions, cases are also conceivable where a three-dimensional point group of some of the first feature points cannot be restored. In a eleventh configuration example, in those cases, as for second feature points that correspond to the area of first feature points for which a three-dimensional point group has been restored, for example, the search area in the stereo matching is set as a narrow area based on parallaxes at the first feature points. Meanwhile, as for second feature points that corresponds to the area of first feature points for which a three-dimensional point group cannot be restored, the search area in the stereo matching is set as a predetermined area. Note that the hardware configuration in the eleventh configuration example can be made equal to that in the above embodiment and the other configuration examples.

According to the eleventh configuration example, even if a three-dimensional point group cannot be restored for a portion of an object OB through the first three-dimensional measurement (three-dimensional measurement using a three-dimensional measurement method other than the stereo camera method; e.g. the active one-shot method) performed prior to three-dimensional measurement using the stereo camera method, stereo matching does not need to be performed while widening the search area with respect to the entire images Img1 and Img2, making it possible to increase the processing speed.

§ 6 Notes

The above-described embodiment is for facilitating understanding of the present invention, and is not intended to interpret the present invention in a limiting manner. The elements provided by the embodiment, and the arrangements, materials, conditions, shapes, sizes, and the like of these elements are not limited to those described as examples, and may be modified as appropriate. The configurations described in different embodiments can be partially replaced or combined.

Note 1

A three-dimensional measurement system (100) comprising:

an image capture unit (200) configured to capture different images (Img1, Img2) of an object (OB), the image capture unit (200) including a first image capture unit (210) and a second image capture unit (220) that are spaced apart;

a first calculation unit (350) configured to calculate a parallax ($d_0$, $d_1$, $d_2$, $d_3$) at first feature points in the images using distance information of a three-dimensional measurement method other than a stereo camera method or information for calculating a distance, using at least one of the first image capture unit (210) and the second image capture unit (220); and a second calculation unit (350) configured to search for corresponding points for second feature points by means of the stereo camera method using the first image capture unit (210) and the second image capture unit (220), to calculate a parallax at the second feature points based on a result of the search, and to specify a three-dimensional shape of the object (OB) based on the parallax ($d_0$, $d_1$, $d_2$, $d_3$) at the first feature points and the parallax at the second feature points, wherein the second calculation unit (350) sets a search area to be searched for the corresponding points for the second feature points, based on the parallax ($d_0$, $d_1$, $d_2$, $d_3$) at the first feature points.

Note 2

The three-dimensional measurement system (100) according to Note 1, further comprising:

a projection unit (200, 110) configured to project measurement light onto the object (OB) to specify the three-dimensional shape.

Note 3

The three-dimensional measurement system (100) according to Note 1 or 2, wherein the first feature points and the second feature points are the same points or are located at positions close to each other.

Note 4

The three-dimensional measurement system (100) according to any one of claims 1 to 3, wherein the three-dimensional measurement method other than the stereo camera method is a method of obtaining three-dimensional information of the object (OB) through one shot by the image capture unit (200).

Note 5

The three-dimensional measurement system (100) according to any one of claims 1 to 4, wherein the second calculation unit (350) makes a threshold for an index of a matching degree in the stereo camera method lower than that in a case of not setting the search area based on the parallax ($d_0$, $d_1$, $d_2$, $d_3$) at the first feature points.

Note 6

The three-dimensional measurement system (100) according to any one of claims 1 to 5, wherein the first calculation unit (350) restores a three-dimensional point group indicating three-dimensional positions of the first feature points, and if the three-dimensional point group could not be restored for any of the first feature points, the second calculation unit (350) sets, for the second feature points that correspond to an area of the first feature points for which the three-dimensional point group could be restored, the search area based on the parallax ($d_0$, $d_1$, $d_2$, $d_3$) at the first feature points, and, for the second feature points that correspond to an area of the first feature points for which the three-dimensional point group could not be restored, the second calculation unit (350) sets the search area to a predetermined area.

Note 7

The three-dimensional measurement system (100) according to any one of claims 1 to 6, wherein the first calculation unit (350) includes a first image processing unit (351) configured to restore a three-dimensional point group indicating the three-dimensional positions of the first feature points, and a second image processing unit (352) configured to two-dimensionally project three-dimensional coordinates of the first feature point in the restored three-dimensional point group onto the images to obtain two-dimensional coordinates of the first feature points, and calculate the parallax ($d_0$, $d_1$, $d_2$, $d_3$) at the first feature points based on the two-dimensional coordinates, and the second calculation unit (350) includes a third image processing unit (353) configured to calculate the parallax at the second feature points by obtaining estimated values of the parallax at the second feature points based on the parallax ($d_0$, $d_1$, $d_2$, $d_3$) at the first feature points, setting a search area to be searched for the corresponding points based on the estimated values of the parallax at the second feature points, and performing stereo matching between the second feature points and the corresponding points in the search area, and a fourth image processing unit (354) configured to specify the three-dimensional shape of the object (OB) based on the parallax ($d_0$, $d_1$, $d_2$, $d_3$) at the first feature points and the parallax at the second feature points.

Note 8

The three-dimensional measurement system (100) according to any one of claims 2 to 7, wherein the distance between an optical axis (P21) of the first image capture unit (210) and an optical axis (P22) of the second image capture unit (220) is equal to the distance between an optical axis (P11) of the projection unit (110) and the optical axis (P21) of the first image capture unit (210) or the optical axis (P22) of the second image capture unit (220).

Note 9

The three-dimensional measurement system (100) according to any one of claims 2 to 7, wherein the distance between an optical axis (P21) of the first image capture unit (210) and an optical axis (P22) of the second image capture unit (220) is longer than the distance between an optical axis (P11) of the projection unit (110) and the optical axis (P21) of the first image capture unit (210) or the optical axis (P22) of the second image capture unit (220).

Note 10

The three-dimensional measurement system (100) according to any one of claims 2 to 9, wherein an optical axis (P11) of the projection unit (110), an optical axis (P21) of the first image capture unit (210), and an optical axis (P22) of the second image capture unit (220) are arranged in the same plane (P2).

Note 11

The three-dimensional measurement system (100) according to any one of claims 2 to 9, wherein an optical axis (P21) of the first image capture unit (210) and an optical axis (P22) of the second image capture unit (220) are arranged in the same plane (P1), and an optical axis (P11) of the projection unit (110) is not arranged in this plane (P1).

Note 12

The three-dimensional measurement system (100) according to any one of claims 2 to 11, wherein the projection unit (200, 120) projects an ordinary illumination light that differs from the measurement light, onto the object (OB).

Note 13

A three-dimensional measurement method performed using a three-dimensional measurement system (100) that includes: an image capture unit (200) including a first image capture unit (210) and a second image capture unit (220) that are spaced apart; a first calculation unit (350); and a second calculation unit (350), the method comprising:

a step in which the image capture unit (200) captures images different images (Img1, Img2) of the object (OB);

a step in which the first calculation unit (350) calculates a parallax ($d_0$, $d_1$, $d_2$, $d_3$) at first feature points in the images using distance information of a three-dimensional measurement method other than a stereo camera method or information for calculating a distance, using at least one of the first image capture unit (210) and the second image capture unit (220); and a step in which the second calculation unit (350) searches for corresponding points for second feature points by means of the stereo camera method using the first image capture unit (210) and the second image capture unit (220), calculates a parallax at the second feature points based on a result of the search, and specifies a three-dimensional shape of the object (OB) based on the parallax ($d_0$, $d_1$, $d_2$, $d_3$) at the first feature points and the parallax at the second feature points, wherein, in the step of specifying the three-dimensional shape of the object (OB), the second calculation unit (350) sets a search area to be searched for the corresponding points for the second feature points based on the parallax ($d_0$, $d_1$, $d_2$, $d_3$) at the first feature points.

LIST OF REFERENCE NUMERALS

100 Three-dimensional measurement system
110 3D projector
111 Laser source
112 Patterned mask
113 Lens
120 2D projector
200 Sensor unit
210 First camera
220 Second camera
300 Computer
301 Control computation unit
302 Communication I/F unit
303 Storage unit
304 Input unit
305 Output unit
306 Bus line
310 Control unit
320 Image acquisition unit
330 Image recording unit
340 Image output unit
350 Image processing unit
351 First image processing unit
352 Second image processing unit
353 Third image processing unit 354 Fourth image processing unit
OB Object
$d_0$ to $d_3$ Parallax at first feature point
$d_{GA}$ (Estimated value of) parallax at pixel (second feature point)
G10 to G13 Pixel that is first feature point
G20 to G23 Pixel that is first feature point
GA Pixel (second feature point)
Img1, Img2 Image
Img1', Img2' Parallelized image
Img10, 20 Two-dimensionally projected image
Img3D1, Img3DM Three-dimensional point group image
ImgM Image (integrated parallax map)
P1, P2, P3, P4 Imaginary plane
P11, P12, P21, P22 Optical axis
S10 to S60 Step
S110 Projection area
S210, S220 Viewing angle
t1 to t8 Time

The invention claimed is:

1. A three-dimensional measurement system comprising:
a first camera and a second camera that are spaced apart and configured to capture different images of an object; and
a processor configured to calculate a parallax at first feature points in the images using distance information of a three-dimensional measurement method other than a stereo camera method or using information for calculating a distance, using at least one of the first camera and the second camera;
wherein the processor is further configured to search for corresponding points for second feature points by using the stereo camera method using the first camera and the second camera, to calculate a parallax at the second feature points based on a result of the search, and to specify a three-dimensional shape of the object based on the parallax at the first feature points and the parallax at the second feature points,
wherein the processor sets a search area to be searched for the corresponding points for the second feature points, based on the parallax at the first feature points,
wherein the processor restores a three-dimensional point group indicating three-dimensional positions of the first feature points, and
if the three-dimensional point group is not able to be restored for any of the first feature points, the processor sets, for the second feature points that correspond to an area of the first feature points for which the three-dimensional point group is able to be restored, the search area based on the parallax at the first feature points, and, for the second feature points that correspond to an area of the first feature points for which the three-dimensional point group is not able to be restored, the processor sets the search area to a predetermined area.

2. The three-dimensional measurement system according to claim 1, further comprising:
a projector configured to project a measurement light onto the object to specify the three-dimensional shape.

3. The three-dimensional measurement system according to claim 1,
wherein the first feature points and the second feature points are the same points or are located at positions close to each other.

4. The three-dimensional measurement system according to claim 1,
wherein the three-dimensional measurement method other than the stereo camera method is a method of obtaining three-dimensional information of the object through one shot by the first camera and the second camera.

5. The three-dimensional measurement system according to claim 2,
wherein the distance between an optical axis of the first camera and an optical axis of the second camera is equal to the distance between an optical axis of the projector and the optical axis of the first camera or the optical axis of the second camera.

6. The three-dimensional measurement system according to claim 2,
wherein the distance between an optical axis of the first camera and an optical axis of the second camera is longer than the distance between an optical axis of the projector and the optical axis of the first camera or the optical axis of the second camera.

7. The three-dimensional measurement system according to claim 2,
wherein an optical axis of the projector, an optical axis of the first camera, and an optical axis of the second camera are arranged in the same plane.

8. The three-dimensional measurement system according to claim 2,
wherein an optical axis of the first camera and an optical axis of the second camera are arranged in the same plane, and an optical axis of the projector is not arranged in this plane.

9. The three-dimensional measurement system according to claim 2,
wherein the projector projects an ordinary illumination light that differs from the measurement light, onto the object.

10. A three-dimensional measurement system, comprising:
a first camera and a second camera that are spaced apart and configured to capture different images of an object; and
a processor configured to calculate a parallax at first feature points in the images using distance information of a three-dimensional measurement method other than a stereo camera method or using information for calculating a distance, using at least one of the first camera and the second camera;
wherein the processor is further configured to search for corresponding points for second feature points by using the stereo camera method using the first camera and the second camera, to calculate a parallax at the second feature points based on a result of the search, and to specify a three-dimensional shape of the object based on the parallax at the first feature points and the parallax at the second feature points,
wherein the processor sets a search area to be searched for the corresponding points for the second feature points, based on the parallax at the first feature points
wherein the processor includes a first image processing unit configured to restore a three-dimensional point group indicating the three-dimensional positions of the first feature points, and a second image processing unit configured to two-dimensionally project three-dimensional coordinates of the first feature point in the restored three-dimensional point group onto the images to obtain two-dimensional coordinates of the first feature points, and calculate the parallax at the first feature points based on the two-dimensional coordinates, and the processor includes a third image processing unit configured to calculate the parallax at the second feature points by obtaining estimated values of the parallax at the second feature points based on the parallax at the first feature points, setting a search area to be searched for the corresponding points based on the estimated values of the parallax at the second feature points, and performing stereo matching between the second feature points and the corresponding points in the search area, and a fourth image processing unit configured to specify the three-dimensional shape of the object based on the parallax at the first feature points and the parallax at the second feature points.

11. A three-dimensional measurement method performed using a three-dimensional measurement system that includes: a first camera and a second camera that are spaced apart and configured to capture different images of an object; and a processor, the three-dimensional measurement method comprising:
- a step in which the first camera and the second camera capture different images of the object;
- a step in which the processor calculates a parallax at first feature points in the images using distance information of a three-dimensional measurement method other than a stereo camera method or using information for calculating a distance, using at least one of the first camera and the second camera; and
- a step in which the processor searches for corresponding points for second feature points by using the stereo camera method using the first camera and the second camera, calculates a parallax at the second feature points based on a result of the search, and specifies a three-dimensional shape of the object based on the parallax at the first feature points and the parallax at the second feature points,
- wherein, in the step of specifying the three-dimensional shape of the object, the processor sets a search area to be searched for the corresponding points for the second feature points based on the parallax at the first feature points,
- wherein the processor includes a first image processing unit configured to restore a three-dimensional point group indicating the three-dimensional positions of the first feature points, and a second image processing unit configured to two-dimensionally project three-dimensional coordinates of the first feature point in the restored three-dimensional point group onto the images to obtain two-dimensional coordinates of the first feature points, and calculate the parallax at the first feature points based on the two-dimensional coordinates, and
- the processor includes a third image processing unit configured to calculate the parallax at the second feature points by obtaining estimated values of the parallax at the second feature points based on the parallax at the first feature points, setting a search area to be searched for the corresponding points based on the estimated values of the parallax at the second feature points, and performing stereo matching between the second feature points and the corresponding points in the search area, and a fourth image processing unit configured to specify the three-dimensional shape of the object based on the parallax at the first feature points and the parallax at the second feature points.

12. A three-dimensional measurement method performed using a three-dimensional measurement system that includes: a first camera and a second camera that are spaced apart and configured to capture different images of an object; and a processor, the three-dimensional measurement method comprising:
- a step in which the first camera and the second camera capture different images of the object;
- a step in which the processor calculates a parallax at first feature points in the images using distance information of a three-dimensional measurement method other than a stereo camera method or using information for calculating a distance, using at least one of the first camera and the second camera; and
- a step in which the processor searches for corresponding points for second feature points by using the stereo camera method using the first camera and the second camera, calculates a parallax at the second feature points based on a result of the search, and specifies a three-dimensional shape of the object based on the parallax at the first feature points and the parallax at the second feature points,
- wherein, in the step of specifying the three-dimensional shape of the object, the processor sets a search area to be searched for the corresponding points for the second feature points based on the parallax at the first feature points,
- wherein the processor restores a three-dimensional point group indicating three-dimensional positions of the first feature points, and
- if the three-dimensional point group is not able to be restored for any of the first feature points, the processor sets, for the second feature points that correspond to an area of the first feature points for which the three-dimensional point group is able to be restored, the search area based on the parallax at the first feature points, and, for the second feature points that correspond to an area of the first feature points for which the three-dimensional point group is not able to be restored, the processor sets the search area to a predetermined area.

* * * * *